United States Patent [19]

Turner

[11] Patent Number: 4,979,641
[45] Date of Patent: Dec. 25, 1990

[54] COMPUTERIZED BEER DISPENSING SYSTEM

[76] Inventor: Charles S. Turner, 12323 Creekspan, Dallas, Tex. 75243

[21] Appl. No.: 281,846

[22] Filed: Dec. 8, 1988

Related U.S. Application Data

[63] Continuation-in-part of Ser. No. 87,258, Aug. 19, 1987, abandoned.

[51] Int. Cl.$^5$ .......................... B67D 5/16; G05B 13/00
[52] U.S. Cl. ......................................... 222/25; 222/54; 222/59; 222/153; 222/641; 364/172; 364/184
[58] Field of Search ...................... 222/14, 17, 20, 22, 222/23, 25, 54–55, 59, 146.6, 394, 640–642, 638, 148, 153; 141/192; 364/153, 172, 184, 479, 510; 221/2

[56] References Cited

U.S. PATENT DOCUMENTS

| | | | |
|---|---|---|---|
| 3,221,936 | 12/1965 | Spinuzza | 222/54 |
| 3,666,143 | 5/1972 | Weston | 222/641 X |
| 3,668,479 | 6/1972 | Weston et al. | 222/641 X |
| 3,718,233 | 2/1973 | Nordhoff | 222/641 |
| 4,004,715 | 1/1977 | Williams et al. | 222/640 X |
| 4,111,243 | 9/1978 | Fetterman | 222/641 X |
| 4,202,387 | 5/1980 | Upton | 222/23 X |
| 4,369,442 | 1/1983 | Werth et al. | 194/217 X |
| 4,478,355 | 10/1984 | Houman | 222/63 X |
| 4,570,822 | 2/1986 | Procacino | 222/14 |
| 4,581,707 | 4/1986 | Millar | 364/510 X |

FOREIGN PATENT DOCUMENTS 3307029 8/1984 Fed. Rep. of Germany ........ 222/54

Primary Examiner—Michael S. Huppert

[57] ABSTRACT

A computerized beverage dispensing system in a first embodiment includes a fitting connected to a tap having a thermoelectric heat pump cooled nozzle and an electrically controlled valve, hereinafter valve. A computerized controller is connected to the fitting and tap. The fitting has a constricted passage through which the beverage flows under pressure and pressure and temperature transducers for measuring the pressure difference across the constricted passage and the temperature thereof. The computerized controller includes a pressure to time look up table used for timing valve operation. If abnormal pressure or temperature occurs the valve is cut off unless an override circuit is activated. A front/back display shows messages programmed into the computerized controller. A modified fitting has a Pitot tube measuring the velocity flow for the pressure transducer for use with a velocity/time look up table for timing valve on time. In a second embodiment a counter initially counts the time to dispense a volume of the beverage; adjustment for volume changes is made thereafter by incrementing the time up or down as necessary to dispense the initial volume of the beverage. A third embodiment uses the count and adjust technique for beverage dispensing volume control, together with system entry being controlled by a code entry matching a stored code. After entry a normal/program (purge) key switch at normal controls the normal system operation and at program/purge secures the system from all but the key carrier for programming and/or purging.

19 Claims, 32 Drawing Sheets

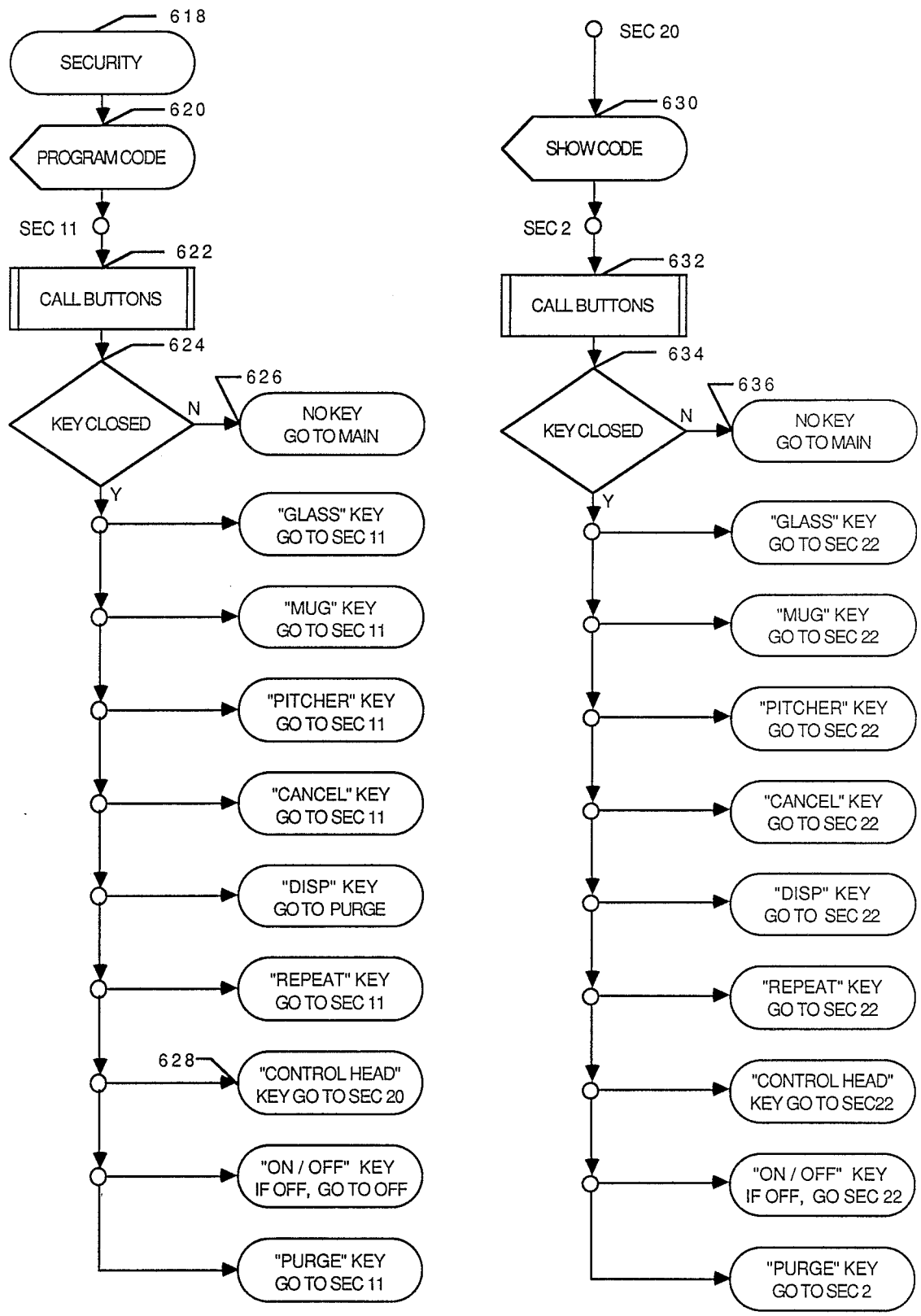
FIG. 6c (Pg. 1 of 2)

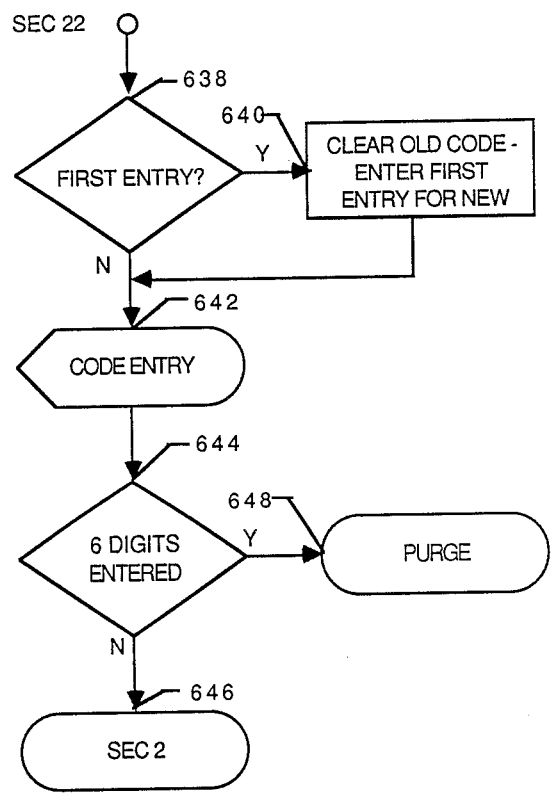
FIG. 6c (Pg. 2 of 2)

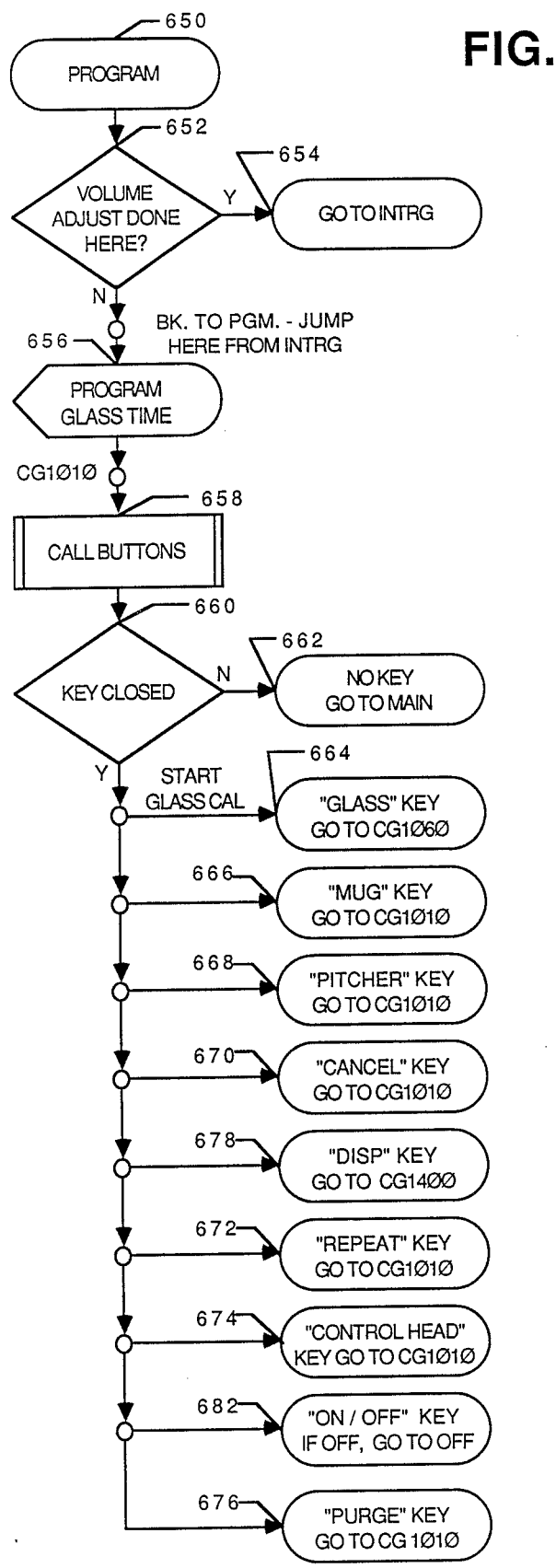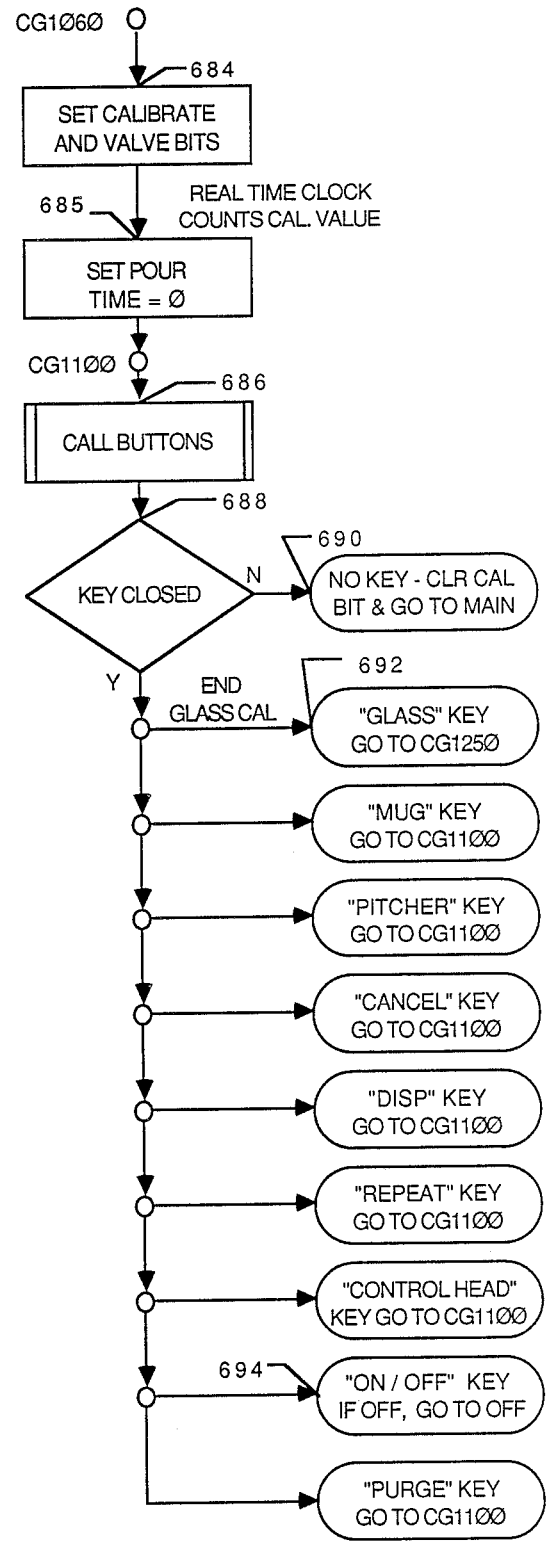
FIG. 6d (Pg. 1 of 3)

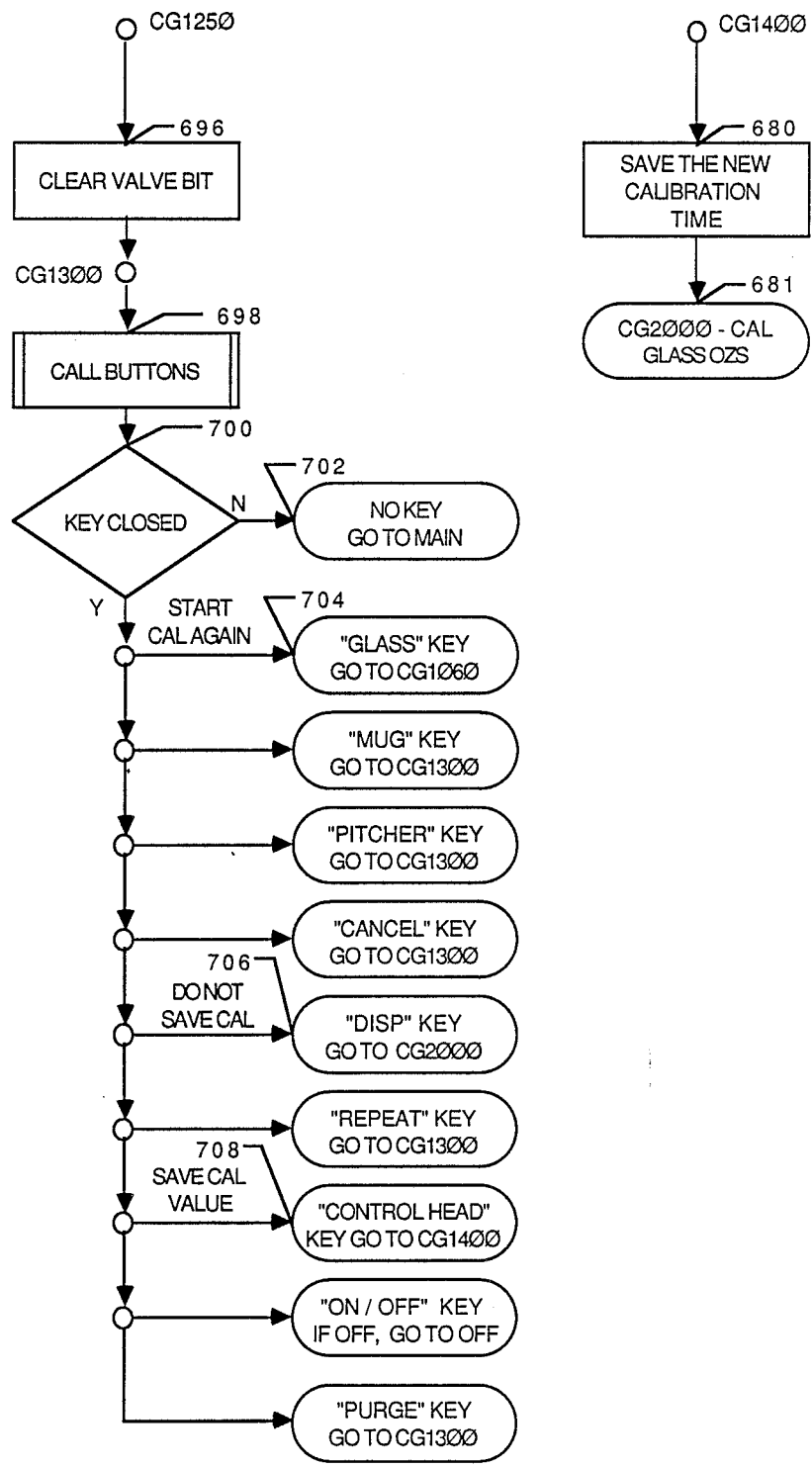
FIG. 6d (Pg. 2 of 3)

FIG. 6d (Pg. 3 of 3)
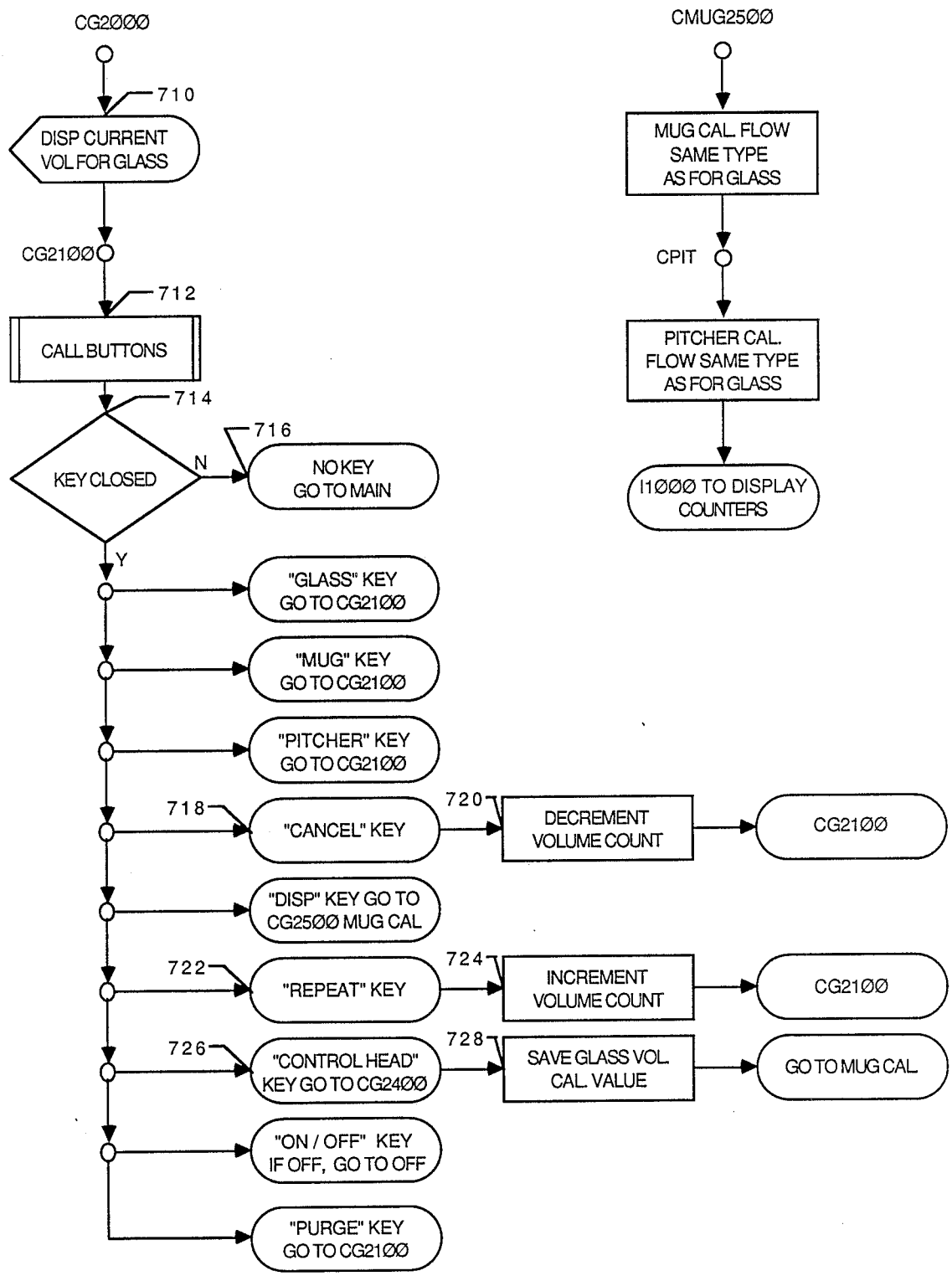

FIG. 6e (Pg. 1 of 2)
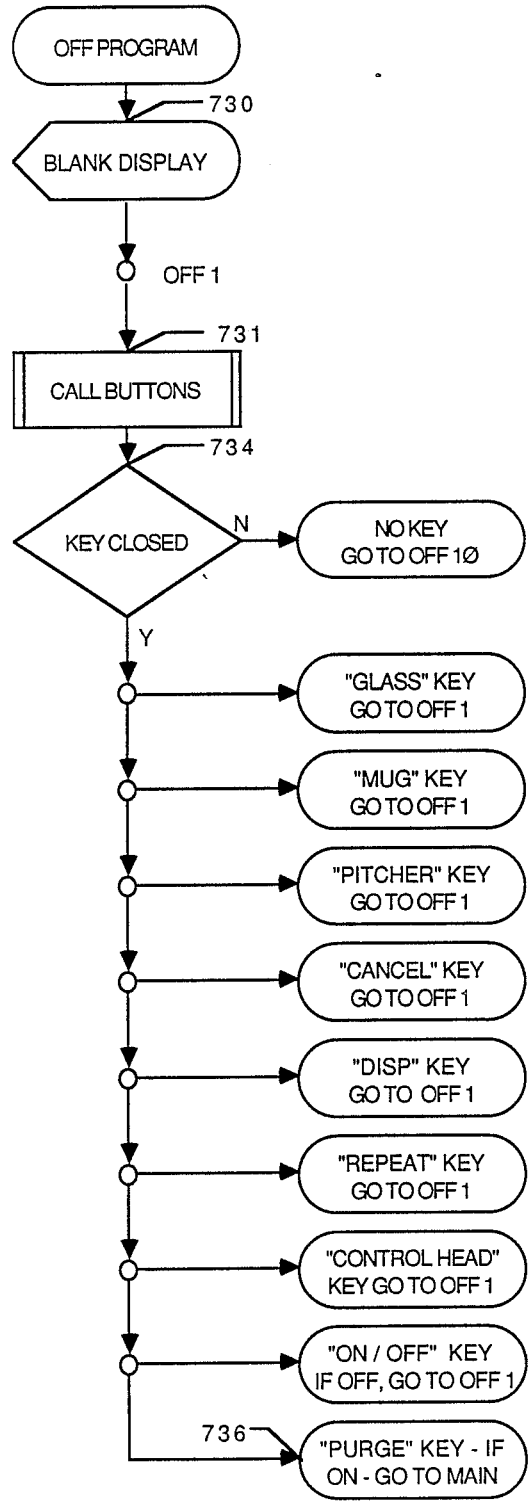
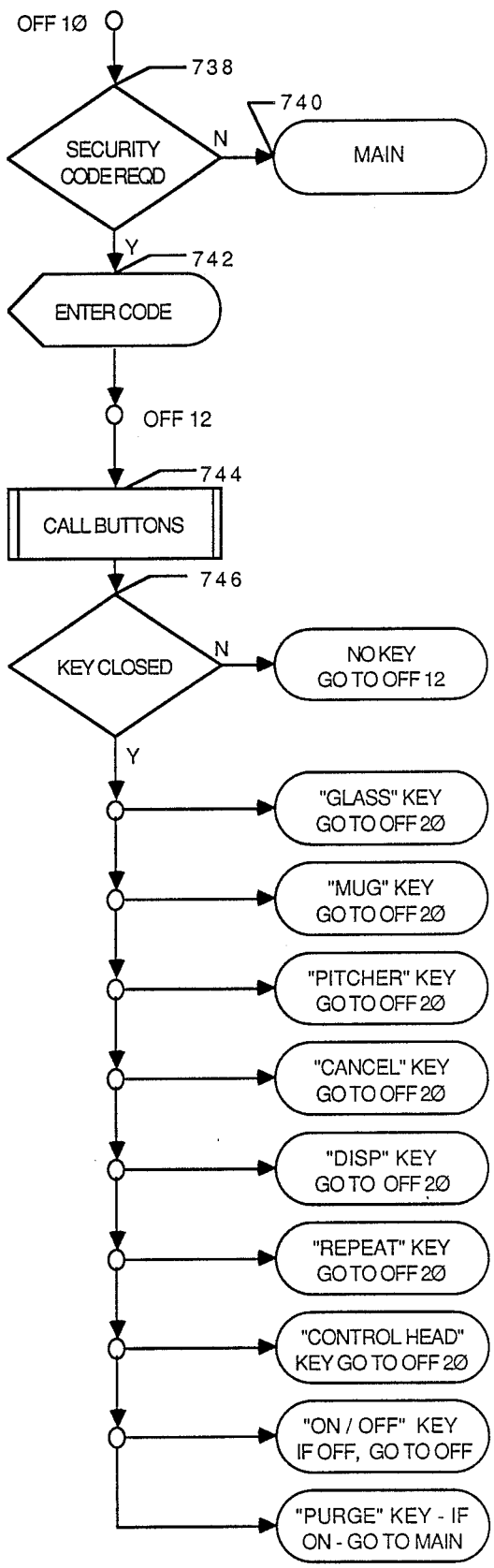

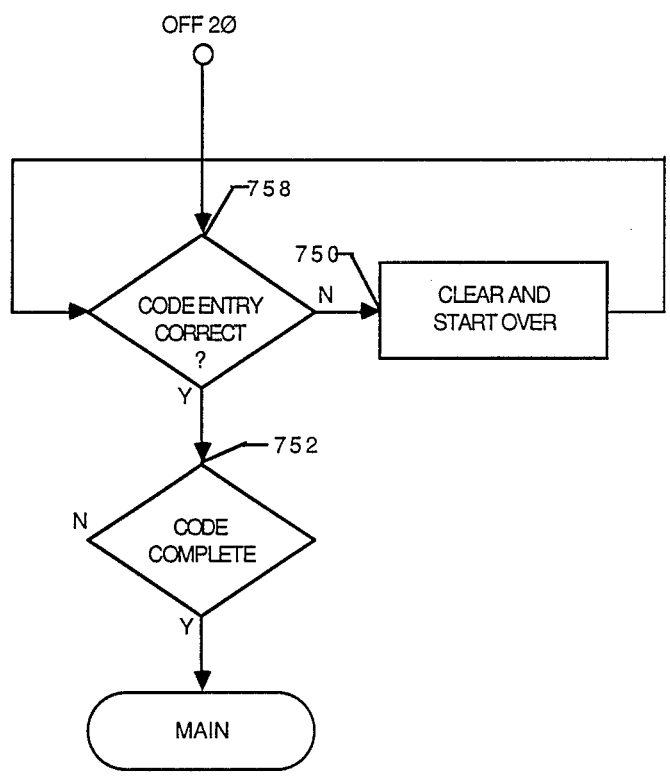
FIG. 6e  (Pg. 2 of 2)

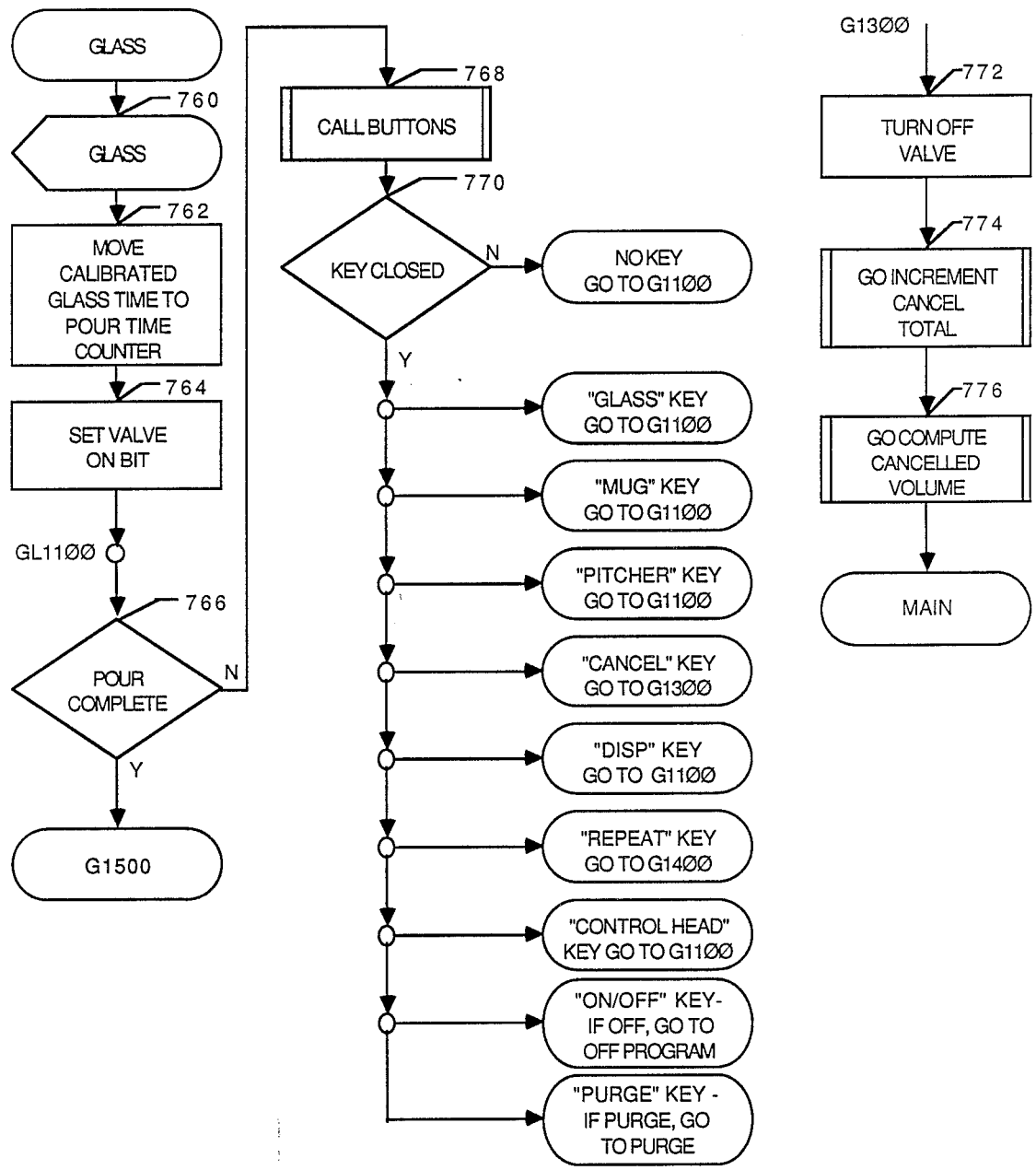
FIG. 6g  (Pg. 1 of 2)

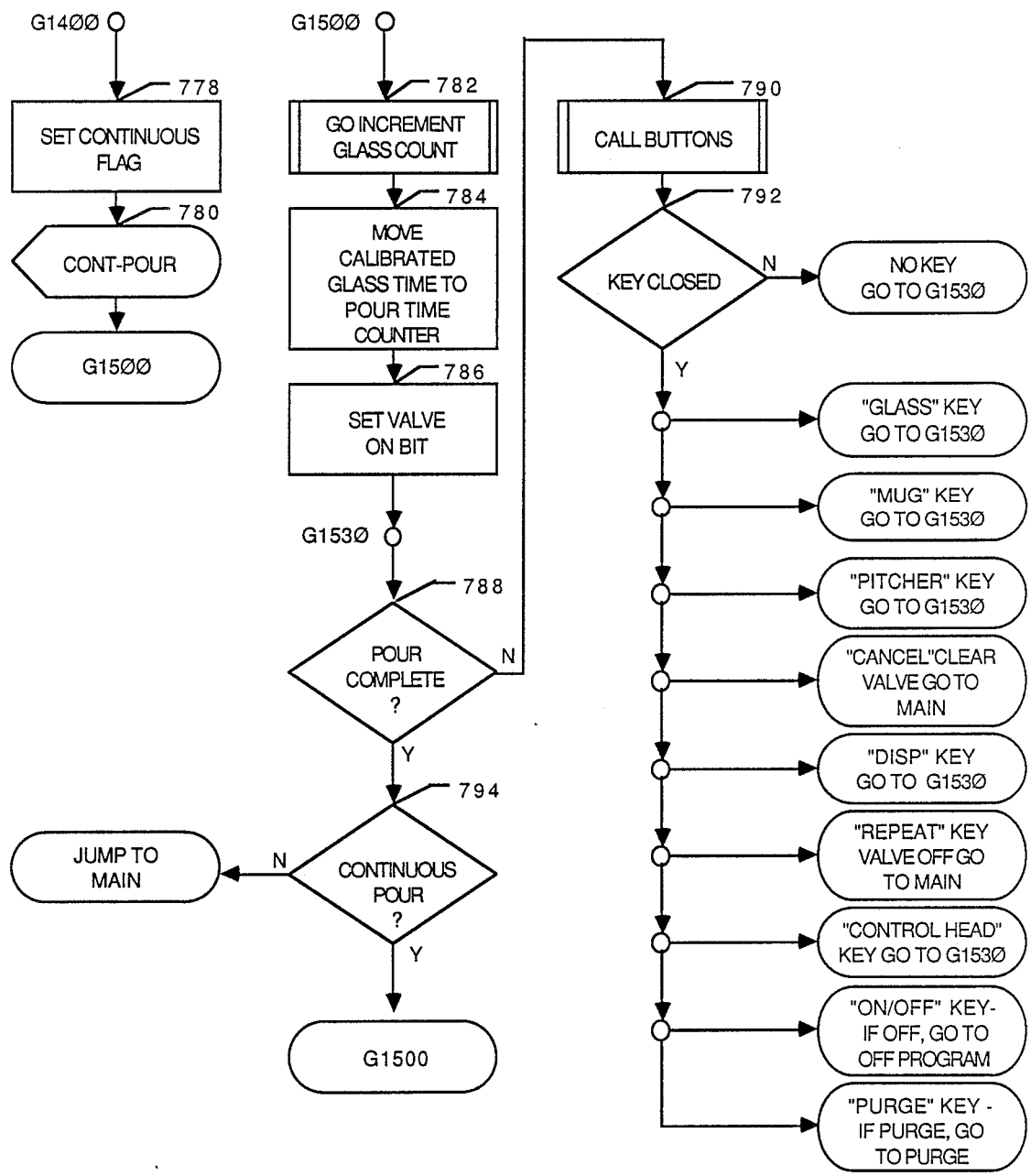
FIG. 6g (Pg. 2 of 2)

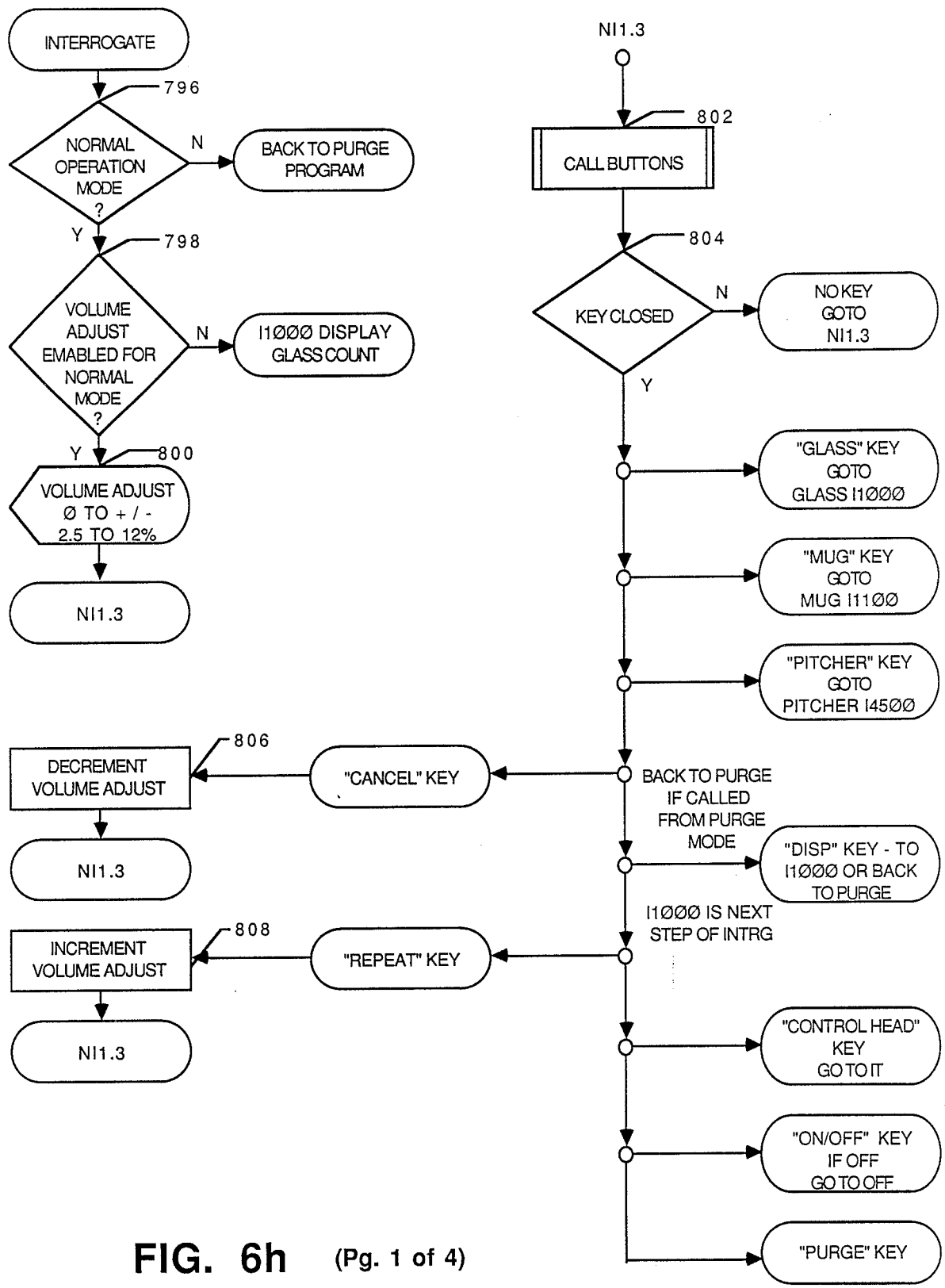
FIG. 6h (Pg. 1 of 4)

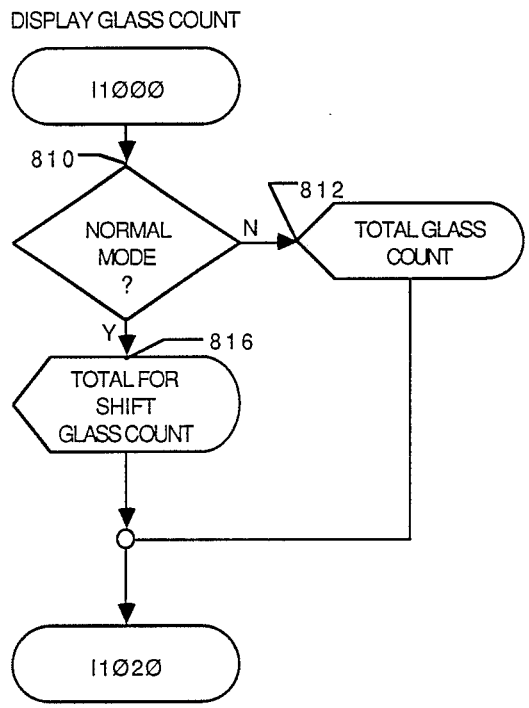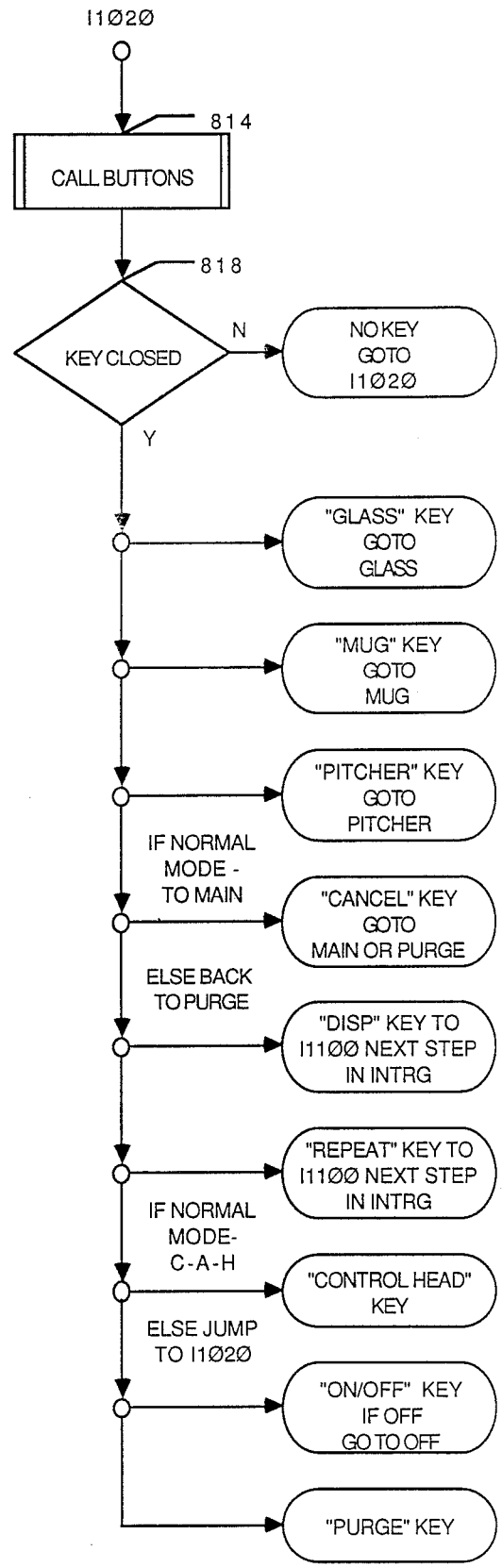
FIG. 6h (Pg.2 of 4)

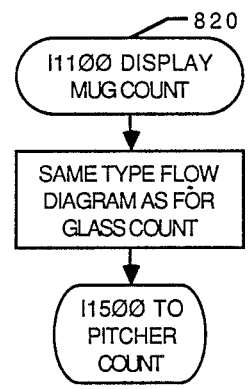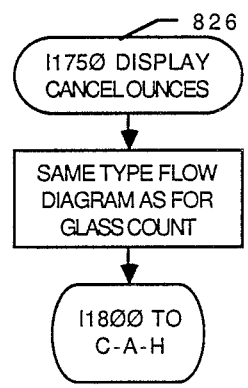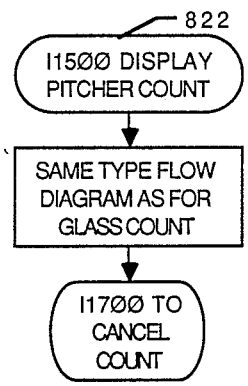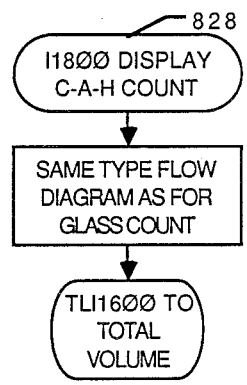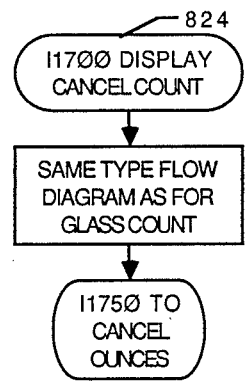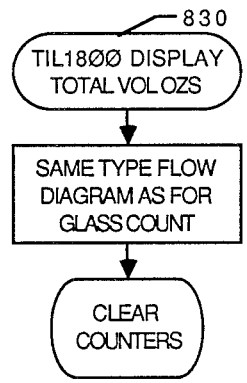
FIG. 6h  (Pg.3 of 4)

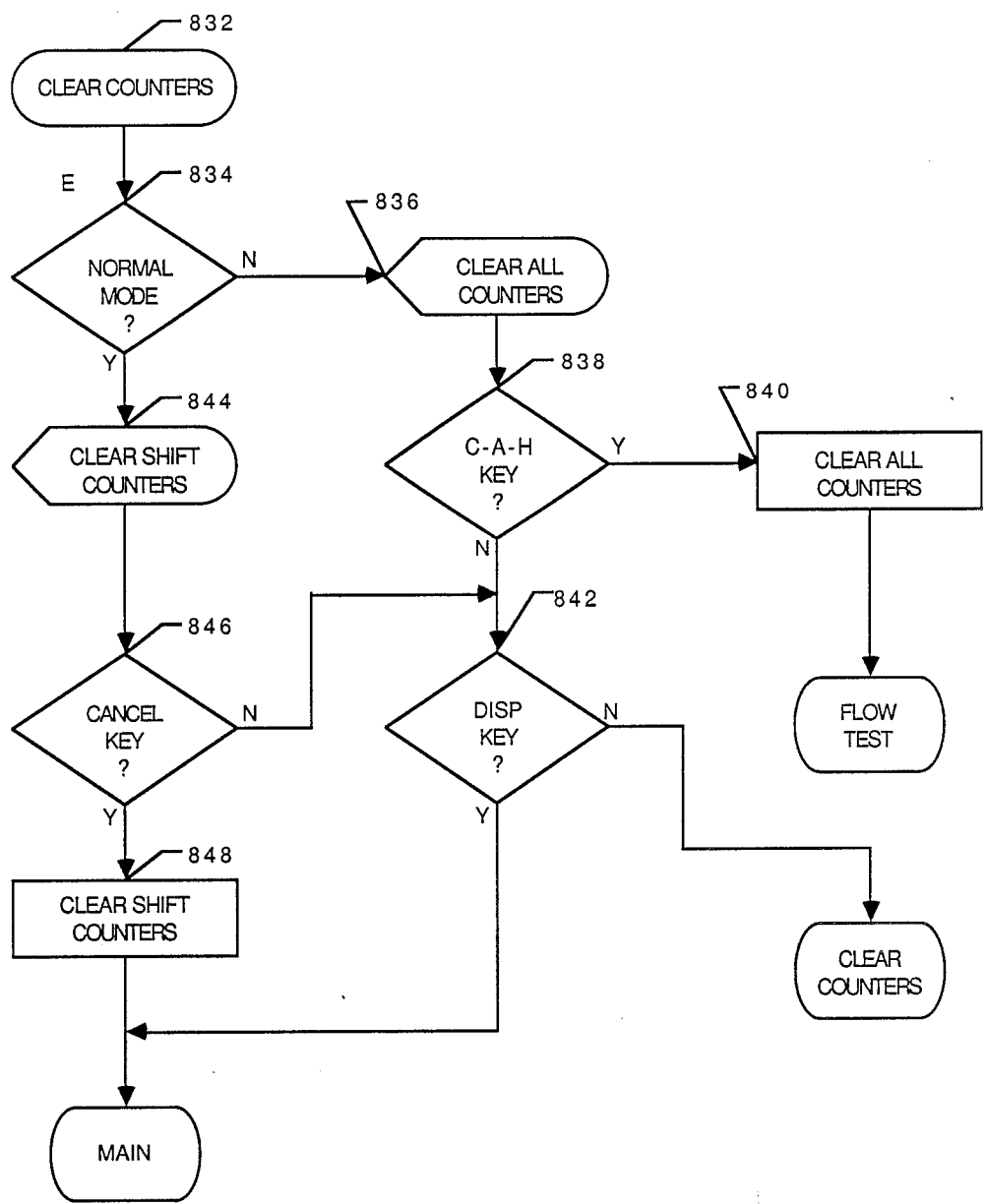
FIG. 6h  (Pg.4 of 4)

FIG. 6k (Pg. 1 of 4)
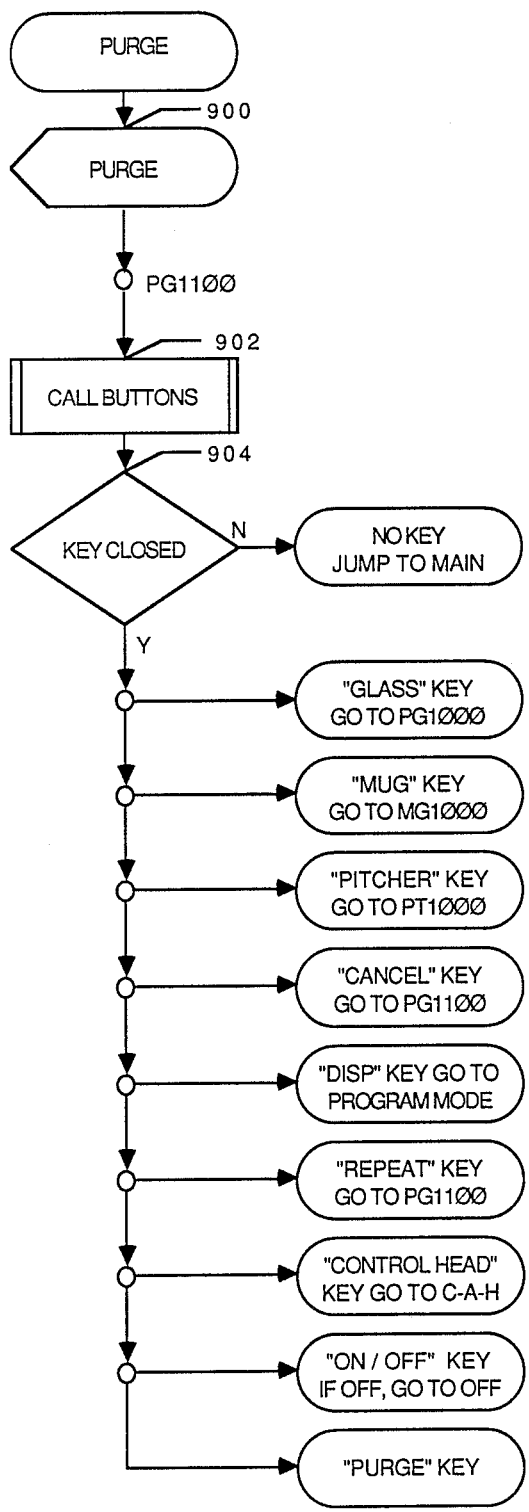
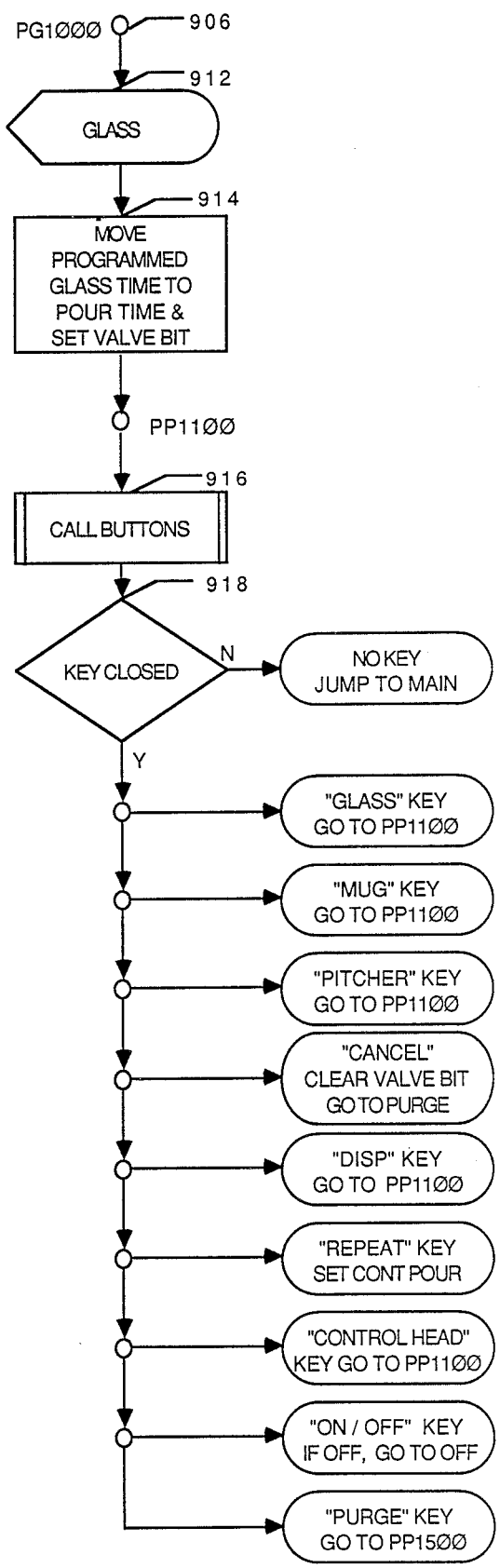

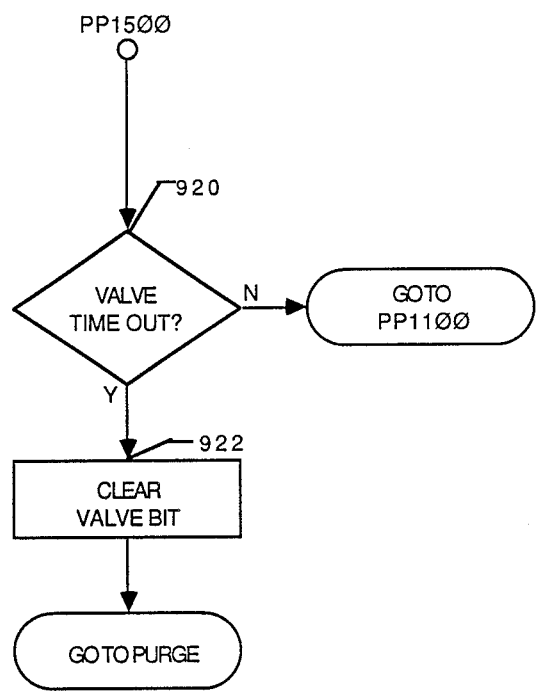
FIG. 6k (Pg. 2 of 4)

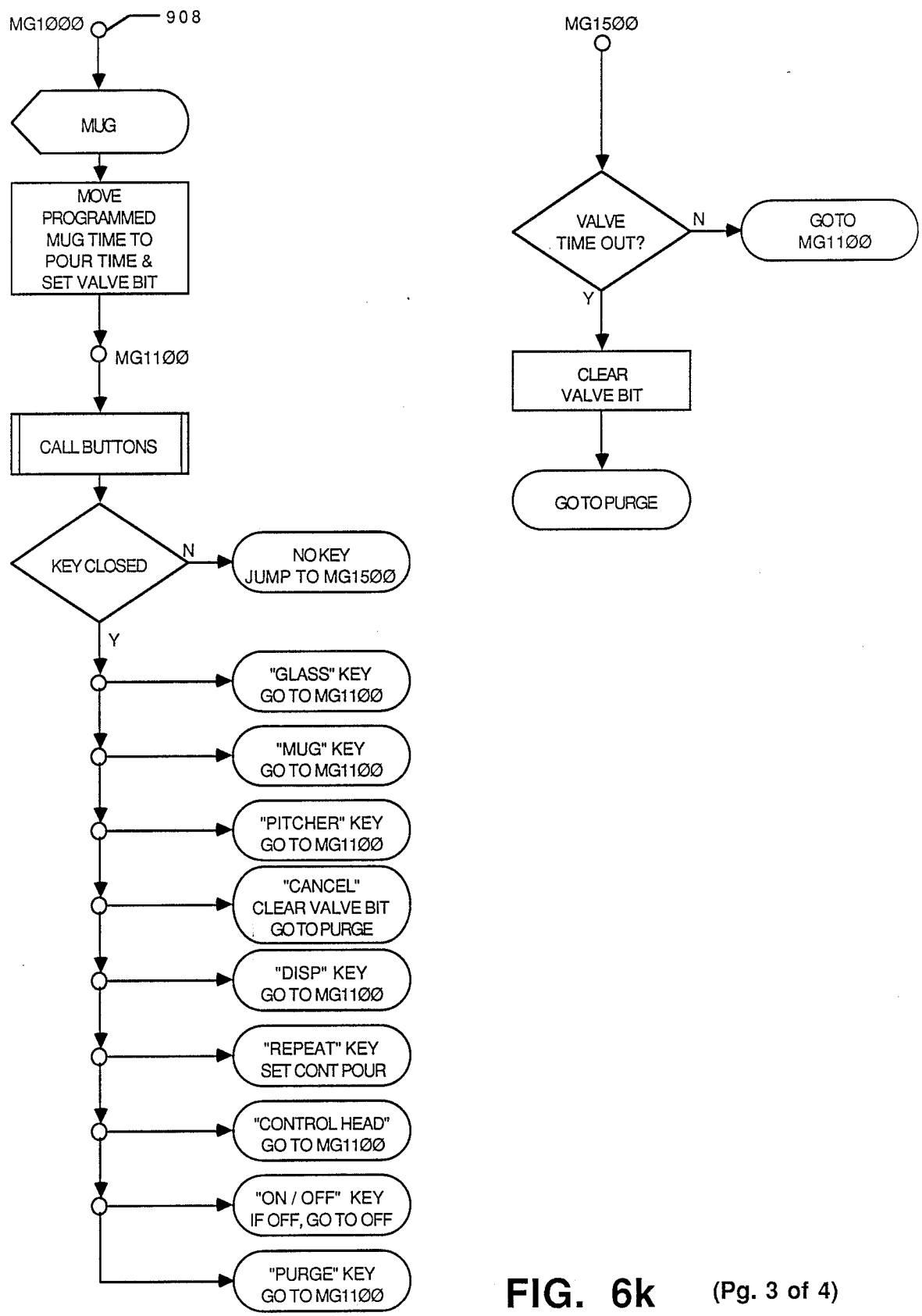
FIG. 6k (Pg. 3 of 4)

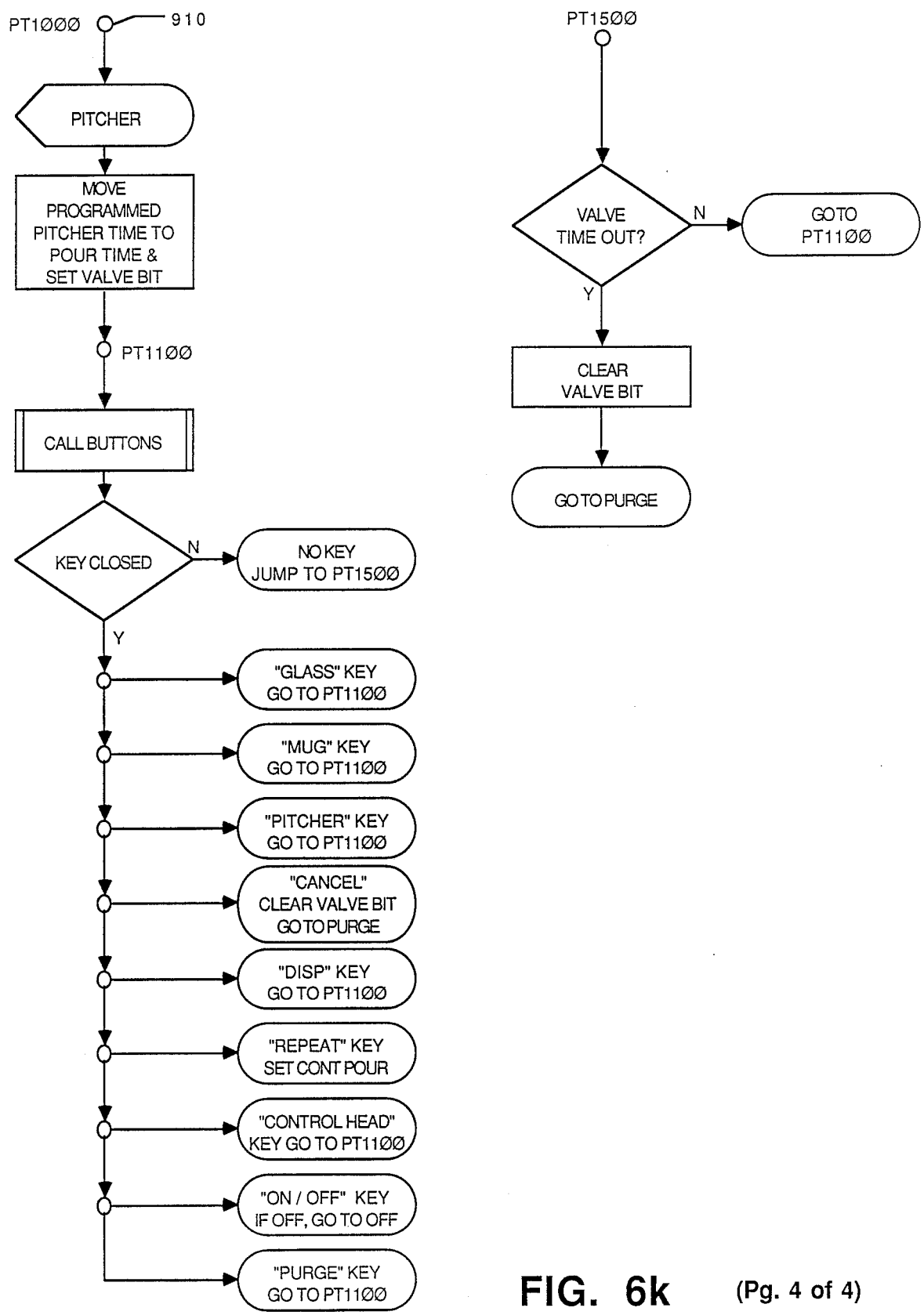
FIG. 6k (Pg. 4 of 4)

COMPUTERIZED BEER DISPENSING SYSTEM

This application is a continuation-in-part of application Ser. No. 087,258 filed Aug. 19, 1987, now abandoned.

This invention relates to beverage dispensers and more particularly to a computerized beer dispensing system.

BACKGROUND OF THE INVENTION

Except for draft beer, all other beverages have readily conformed to standard dispensing equipment. The unique qualities and ideosyncracies of draft beer have created dispensing problems which have created havoc to all automatic dispensing units based upon a preset time of flow, thereby negating the control and accounting process they were intended to perform. These dispensers were required to rely on separate systems for controlling the carbon dioxide ($CO_2$) pressure which had to be constant, and the temperature which had to be controlled within a narrow range. For these dispenser control systems to operate properly, the operator had to be on guard constantly to monitor and adjust any variations in pressure and temperature. Failure to correct these associated systems resulted in substantial waste, underfills and overfills.

The waste stems from the fact that draft beer contains active bacteria which create $CO_2$. The beer becomes supersaturated with the $CO_2$ and easily "fractures" to produce beer foam. Very close parameters of temperature and pressure must be maintained to control excessive foaming and waste.

The prior art metering and measuring dispensers did not have the capability to recognize and specify variances in the associated systems that directly influenced their proper functioning. As a result the associated system became so far out of proper dispensing parameters that waste could not be prevented. Because, it took more testing to fine tune the system back into balance and normal operation additional waste occurred.

A prior art beer dispensing system included a tap for automatically dispensing either the exact quantity of beer necessary to fill a glass or the exact quantity to fill a pitcher. The exact quantity was a function of time. The time for filling a glass or pitcher was set by turning the glass or pitcher selection button to set and adjust potentiometers (resistors) of RC timing circuits. Thus, if during service the selection button is turned or if the pressure changes the exact quantity was either an underfill or an overfill.

A computer was provided to record each dispensing operation of the tap. The tap comprised a modified Perlick valve, and a bell crank coupled to the actuating lever of the valve, and a solenoid for operating the bell crank to open the valve. An electronic timing circuit was provided for energizing the solenoid for predetermined periods of time for dispensing the desired quantities of beer. An add-a-head lever was provided for manually opening the valve a slight amount and thereby dispense foam for reforming a beer head. Those persons skilled in the art desiring further information for this prior art system are referred to U.S. Pat. No. 3,718,232, issued Feb. 27, 1973, to John J. Nordhoff, for a "Beer Dispensing System."

A major difference between the present invention and the prior art is the present invention in a first embodiment monitors, respectively, either the changes in pressure of the flow rate or the velocity of the beer and adjusts the on time of the dispenser accordingly to provide the exact amount of beer to fill the glass, mug, or pitcher, thereby preventing under/over fills. The dispensing system further includes pressure and temperature monitors for monitoring the beer pressure and temperature at the tap.

Another major difference is the present invention of the first embodiment is capable of monitoring associated systems, including the temperature of the beer and the $CO_2$ pressure and provide visible warnings.

A further major difference is the present invention of the first embodiment provides in a single housing a computerized beer dispensing system which features:

A lighted annunciator panel for displaying functions on two sides.

A function select key for recalling all operating modes in memory.

A repeat pour key for use during peak business periods in which a short delay is provided between pours.

An error cancel key for computing all errors and time on during the errors.

A glass function key for drawing a glass of beer (foam).

A mug function key for drawing a mug of beer.

A pitcher function key for drawing a pitcher of beer.

A control-a-head key for head replacement made necessary by any hostess delay.

A keyed off/on/purge switch which permits purging while maintaining the memory intact.

In a second embodiment, the major difference between the present invention and the prior art is that during the programming mode the time it actually takes to fill a container is counted and the count programmed into a microprocessor; thereafter the volume count may be incrementally changed during either the operating or programming mode to adjust the quantity up or down as required to dispense the desired quantity. In this embodiment the pressure and temperature monitoring function can be either retained or deleted from the program.

In a third embodiment, the present invention differs from the prior art in that the beer dispenser is initialized by a push button switch, but entry for operation is made using a code. The public relation message capability has been omitted to reduce the display size, the initial time count to fill a selected container is used with a subsequent adjustment technique to maintain dispensing the selected quantity, and retention of the temperature and pressure monitoring function is optional.

SUMMARY OF THE INVENTION

Accordingly an object of the invention in all embodiments is to provide accounting information.

Another object of the invention in all embodiments is to combine the active components of the system in one housing for eliminating outside wiring, black boxes, and counters.

Still another object of the first and second embodiments of the invention is to provide a computerized beer dispensing system for controlling all phases of draft beer dispensing including: accounting, inventory control, price variations, time periods associated with price variations, annunciating public relation type messages, and inspecting and supervising associated systems.

Yet another object of the first and second embodiments of the invention is to provide front and back side display screens for clearly illustrating the functions and their on-going status for constant monitoring and easy viewing by operator and customers.

A further object of the first and second embodiments of the invention is to provide, respectively, for adjusting the flow time as associated systems vary within their operational parameters, to warn the operator of impending problems, and to shut down the system when acceptable operating parameters of the systems are exceeded, or for determining a count required to fill a selected container and program the count into a controller for dispensing the selected container and thereafter incrementally adjusting the count upward or downward to maintain the selected volume.

Yet a further object of the first and second embodiments of the invention is to provide a time shared computer for a multiple tap dispensing system.

Still a further object of the first and second embodiments of the invention is to provide an output for connecting the sales information to a cash register.

Yet still a further object of the invention is to provide in a third embodiment a compact, low cost, computerized beer dispensing means having a power on switch, a system entry code and a key switch for selecting programming/purge and operating modes of operation.

Briefly stated the computerized beer dispensing system includes a beer tap mechanism having a solenoid operated valve connected to a beer keg. In a first embodiment a tap connector fitting having a temperature sensor and a pressure sensor mounted thereon is connected to the keg. The temperature and pressure sensors continuously sense the temperature and pressure of the beer flowing through the fitting. The pressure in the fitting is monitored by a computer having a pressure/time look up table and the time of flow is adjusted by the computer in light of the instant pressure to provide a set quantity of fluid. In the first embodiment the fitting can be modified to measure the velocity of the fluid flow in the fitting instead of the fluid pressure and the computer uses a velocity indicating pressure/time look up table to regulate the flow time. The computer also monitors the temperature and pressure of the dispensing system.

In the second and third embodiments, use of the fitting is optional as the computer is not programmed to use either pressure or velocity to time the flow rate. In lieu thereof a counter of the computer is used to count the time required to actually fill a selected size container and the computer is programmed to use the count thereafter to fill such containers during normal operation. After programming and during operation any volume adjustments required are made by entering incremental up/down count changes. The fitting may be kept to provide the pressure and temperature monitoring function if desired.

The tap includes: a housing for housing in one convenient location for the first and second embodiments a front and back display for displaying programmed functions on two sides; a keypad including operational keys for quantity selection, repeat pour, cancel, a control-ahead, and an off/on/purge lock switch for operation mode selection; and a programmable controller connected to the valve solenoid, temperature and pressure sensors, keypad, and display.

In the first embodiment and as an option for the second and third embodiments the programmable controller constantly monitors the associated pressure and temperature systems and keypad. If the pressure, as measured by the pressure transducer, and temperature vary beyond programmed limits, instructions are issued to display a flashing notice; if they continue to deteriorate to within a "no-go" range, instructions are issued to display a constant notice and the system is shut down. Further, in the first embodiment if the associated system pressure fluctuates within acceptable operating parameters, the controller will automatically adjust the flow rate to dispense the programmed volume. But, in the second and third embodiments the computer counts the actual time to fill selected containers and the computer is programmed to open the valve for the count lengths to fill the containers. If later the volumes dispensed changes, the count is incrementally changed to adjust these quantities. In the first and second embodiments, public relation messages such as "HAPPY HOUR" and "HAPPY HOUR OVER", which are associated with the time are automatically displayed by the display.

In all embodiments, the programmable controller monitors the keypad operation to compute and store in memory the number of glasses, mugs, and pitchers sold and the number of ounces dispensed for accurate inventory control. In the first and second embodiments, this information is stored on a shift, day, week, month and year basis for ready access by management. The price per glass, mug, and pitcher and the applicable time periods for the prices is programmed into the controller. Thus, a cash register can be attached for automatic operation.

BRIEF DESCRIPTION OF THE DRAWINGS

FIGS. 6a–6k constitute flowcharts for the operation of the third embodiment of the invention.

DETAILED DESCRIPTION OF THE PREFERRED EMBODIMENT

The computerized beer dispensing system 10 (FIG. 1) constituting the subject matter of the first embodiment of the invention is for a typical beer facility. The typical beer facility, not shown, includes a key housing for a $CO_2$ bottle and one or more kegs of beer, a refrigerator for cooling the beer keg(s) and the stanchion, and a sink type support for supporting the beer receptacle. Beer is dispensed from the keg, through the stanchion, sensor fitting, and dispenser into a glass, mug, or pitcher. The dispensing tap is controlled by the computerized controller. It will be appreciated by those skilled in the art that more than one tap can be provided and the plurality of taps can be controlled by a single time shared programmable controller. Also, although the invention is described in connection with beer as an example of the beverage, it is not limited to beer dispensing systems, but can be used in dispensing systems for other beverages with equal facility.

Figure 1:
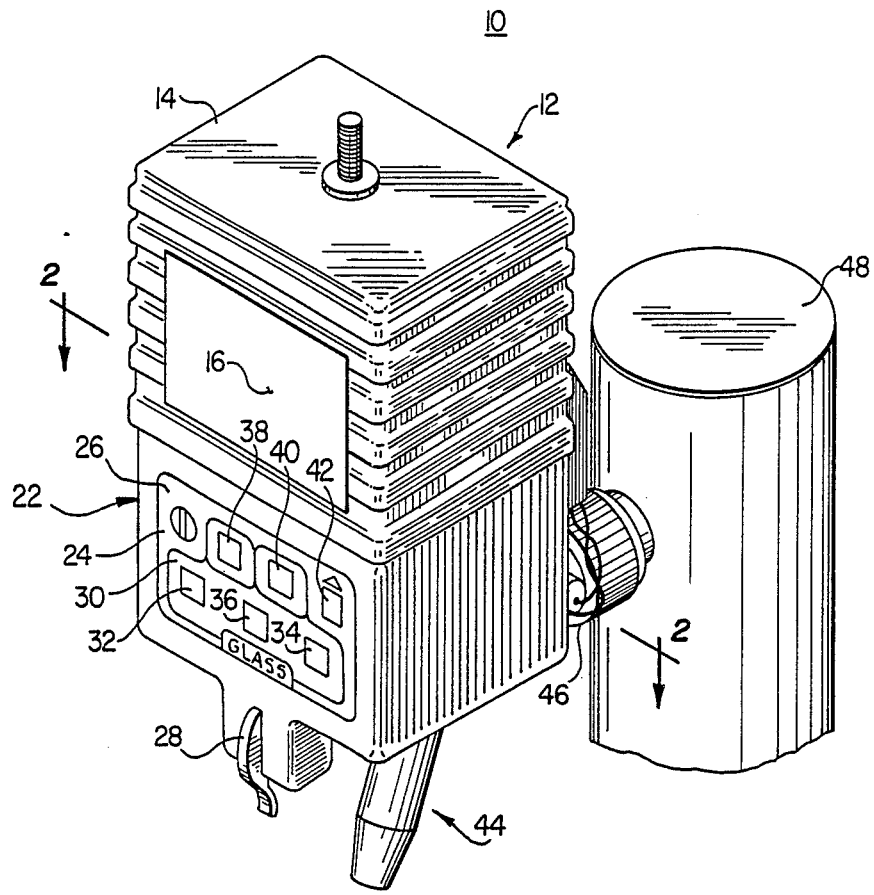
FIG. 1 is an isometric view of the computerized beer dispenser of the first and second embodiment of the invention.

The computerized beer dispensing system 10 for the first and second embodiments includes a housing 12 (FIG. 1). Housing 12 includes a top compartment 14 having front and rear display panels 16 and 18 and a computerized controller 20 (FIG. 3), and a bottom compartment 22 (FIG. 1) having a front panel 24 including an off/on/purge switch 26, a glass dispensing switch 28, and a keypad 30. The keypad 30 includes a mug button 32, pitcher button 34, head control button 36, cancel button 38, repeat pour button 40, and a display button 42. A beer dispenser tap 44 (FIGS. 1, 2a & 2b) supports the housing 12. The tap 44 for the first embodiment is connected by either a sensor fitting 46 (FIG. 2a) or a modified sensor fitting (FIG. 2b) to the beer stanchion 48. If the second and third embodiments do not include the temperature and pressure monitoring function requiring temperature and pressure sensors the fitting may be omitted, or if included for improved flow the sensors are not required.

DISPLAYS

The front and rear displays 16 and 18 of the housing 12 (FIG. 1) for the first and second embodiments each include top and bottom sections. Each section is, for example, a vacuum fluorescent display (FG 12A2 manufactured by Nartoke Inc.). The displays are for displaying all the programmed functions and their on going status for constant monitoring and viewing by both the operator and customer. In addition during default the displays display programmed messages including beer advertisements and other location operator programmed announcements. Messages such as HAPPY HOUR and HAPPY HOUR OVER can be timed to the actual time of day, and happy hour price can be set for accurate accounting and sales purposes. The system has thirty-one standard messages originally stored in memory and up to 225 custom messages can be added by the operator at his option. The standard messages are shown in TABLE 1.

TABLE I

| | PRE-PROGRAMMED MESSAGES | |
|---|---|---|
| | TOP DISPLAY | BOTTOM DISPLAY |
| 1. | HI! I'M "CC" | WELCOME |
| 2. | HAVE A COLD | BUD LIGHT |
| 3. | HAVE A COLD | COORS LIGHT |
| 4. | HAVE A COLD | MILLER LITE |
| 5. | HAVE A COLD | FALSTAFF |
| 6. | HAVE A COLD | LONE STAR |
| 7. | HAVE A COLD | BUDWEISER |
| 8. | HAVE A COLD | COORS |
| 9. | HAVE A COLD | MILLERS |
| 10. | HAVE A COLD | HAMMS |
| 11. | HOORAY!! | HAPPY HOUR |
| 12. | HAVE A MERRY | CHRISTMAS |
| 13. | HAPPY | NEW YEAR |
| 14. | DON'T JUST | SIT THERE |
| 15. | BUY A | BEER |
| 16. | ASK ABOUT | PRIV PARTIES |
| 17. | RELAX | HAVE A BEER |
| 18. | FREE BEER | FOR |
| 19. | UNESCORTED | LADIES |
| 20. | FREE | HORSDOEUVRES |
| 21. | WITH A | DRAFT BEER |
| 22. | WELCOME TO | THE BEST |
| 23. | LOUNGE | IN TOWN |
| 24. | RESTAURANT | IN TOWN |

TABLE I-continued

| | PRE-PROGRAMMED MESSAGES | |
|---|---|---|
| | TOP DISPLAY | BOTTOM DISPLAY |
| 25. | HOTEL | IN TOWN |
| 26. | BAR | IN TOWN |
| 27. | HIP HOORAY | YOU'RE HERE! |
| 28. | FREE BEER | 3 TO 4 PM |
| 29. | WITH LUNCH | MON & FRI |
| 30. | 50 CENT BEER | 2 TO 4:30 PM |

The operator can select one or more messages to be displayed in the normal (default) mode, thereby customizing computer control to his particular installation. All messages, both standard and custom, are stored in a message queue.

In programming the display the operator must select messages from the message queue and enter them into a display queue. This permits the display of one message continuously or two or more messages sequentially in two second intervals, for example.

Sequential messages may be displayed longer than two second intervals by selecting one such message in a display chain two or more times successively; i.e., by selecting a given message two times successively it would be displayed for four seconds before moving on to the next sequential message.

In the third embodiment (FIG. 5), the display 508 is a single sided display suitable for displaying operational and accounting type information.

FRONT PANEL

Off/On Purge Key Switch

The off/on/purge key switch 26 (FIG. 1) for the first and second embodiments turns the unit on. There are two keys with each unit, the operations key and the master key. The operations key will only turn the unit from off to on. The master key will turn to all three positions, off, on, and purge. This is the first of many control features built in the system that permits only an authorized person to operate the system in a mode that will by-pass the accounting system and memory.

The off position shuts the power off to a faucet operating solenoid thereby precluding any dispensing. The display panels will read SYSTEM OFF when in the off position.

The on position activates the system for service and if all systems are normal will display a programmed message on the screen. However, in the first embodiment and optionally in the second and third embodiments, if the temperature or pressure readings are out of proper operating parameters, the problem will be identified by a flashing message on the display screen, such as TEMPERATURE LOW/HIGH OR PRESSURE LOW/-HIGH. This will alert one to the special problem so that corrective measures can be taken.

In the purge position the master key cannot be removed from the unit until it is turned back to the off or on position and therefore should not be out of reach of an authorized carrier during the purging or programming mode.

The purge mode is designed to permit operating the system during cleaning and in programming a hereinafter described. Whenever the glass, mug, control head or pitcher function is activated in the purge mode no count will be added to any of the totals. In the purge mode all of the functions will operate permitting the cleansing solution to be flushed through the system, without disrupting or changing any of the accumulated totals. To purge the system, the key switch is turned with the master key to the purge position and any one of the four dispensing buttons is pressed to permit the cleaning solution to be dispensed. Normally the pitcher button is pressed as that permits much more solution to be flushed through the faucet before shut off occurs.

When purging is completed, the master key is turned to the on or off position and the master key removed. Under normal operation the two position (operation) key is left with the system manager, and the three position (master) key is left with the general manager.

In the third embodiment (FIG. 5) a push button switch 510 is provided for system initialization. For entry a code is entered into the computer using selected keys of the keypad 30. The entered code is compared with a stored code for entry. A normal/program key switch 512 is provided to set the operating mode to normal for dispensing operations and to program for purging and programming the computer. Upon switching to the program mode the system enters the purge mode and "PURGE" is displayed; subsequent pressing of the display button 42 starts the programming mode with a prompt to "PROGRAM GLASS TIME" being displayed.

GLASS FUNCTION SWITCH

The glass function switch 28, hereinafter described, is adapted in all three embodiments as shown (FIG. 1) for actuation by pressing against the inside rim of a glass. During normal operation, this pressure activates the unit to dispense a specific size glass of beer. The word GLASS is displayed on the display screens confirming the glass selection. Even though the switch is held in the pressed position, only one glass will be dispensed. To dispense another glass, the switch must be released and pressed again. Repeated glass dispensing without having to reactivate the switch is possible using the repeat function hereinafter described.

During the programming mode, the glass, mug, and pitcher switches 28, 32, and 34 (FIG. 5) respectively, are pressed once to start simultaneously the flow of beer and counter and again pressed to stop the flow and counter. In the first embodiment the counter counts incremental quantities as a function of the flow rate and stores the counts in memory. In the second and third embodiments, the counts of the counter for the glass, mug, and pitcher are stored in memory to control valve operation for dispensing glasses, mugs, or pitchers of beer. During normal operations to adjust the volume of beer dispensed, the display key 42 is pressed until "volume adjust" is displayed. This function allows the operator to adjust the programmed quantities (glass, mug, and pitcher) up to a maximum of 12 ½%, with increase or decrease in quantity. To increase the quantity in 2 ½% steps the repeat key 40 is pressed one or more times; to decrease, the cancel key is similarly pressed.

Mug Pitcher and Control-A-Head Functions

In all three embodiments, to obtain a mug of beer, a pitcher of beer or to reform a head of foam on a glass, mug, or pitcher of beer, the mug function button 32, pitcher function button 34, or the control-a-head button 36, as appropriate, is pressed while holding a container for the beer selection under the faucet. This will activate the unit and dispense a specific size mug, or pitcher of beer or a head of foam on the glass, mug, or pitcher. The display will display the word MUG, PITCHER, or HEAD in accordance with the selection. Even though the selected button is held in the pressed position, only one beer or head will be poured for the selected container. To dispense another mug or pitcher or head of foam, the appropriate key must be released and pressed again. Nevertheless, repeated mug, pitcher or head dispensing is possible using the repeat function described below.

The control-a-head button is pressed to dispense a specific amount, for example, about one ounce of beer. The splashing action of dispensing a small amount of beer on the surface of the dissipated beer will agitate and reconstitute the head of foam. It may take two or three injections to develop a proper head of foam.

Keypad-Cancel Function

In all three embodiments, the cancel function button 38 is pressed to immediately deactivate the system and terminate any current operation. No count will be recorded for the canceled item, but one count will be recorded under the cancel function, the total number of ounces poured prior to activating the CANCEL button computed, and the total number of ounces recorded. This function is recallable under CANCEL OZS. when the display function is activated as hereinafter described.

Keypad-Repeat Function

In all three embodiments, when several glasses, mugs, pitchers, or heads of foam are desired, they are obtainable by first pressing the desired size button and then while that function is operating, pressing the REPEAT button 40. The word CONT., for continuous pouring, is displayed on the display screen adjacent to the item being dispensed. This display is to alert the operator and serves as a reminder that the repeat function is on. For container exchange, as each dispensing is completed a short delay, for example, one second, ensues, then the unit will automatically repeat the pouring operation. To deactivate the repeat function, the repeat button is pressed again during the last dispensing operation. The CONT. word then vanishes from the display, indicating the unit is now in the single dispensing mode.

Keypad-Display Function

In all embodiments, to recall and display all the functions and dispensing totals in sequence for review, the DISPLAY button 42 is pressed repeatedly. Thus, when the DISPLAY button is pressed the word GLASS appears on the upper display and the total number of glasses counted appears on the lower display. Repeated pressing of the DISPLAY button displays individually and sequentially the words MUG, PITCHER, CONTROL-A-HEAD together with the total numbers for each dispensed, CANCEL and CANCEL OZS. together with the number of cancels and number of ounces poured prior to cancellation, respectively, and total ounces, together with the number dispensed. Continued pressing of the DISPLAY key repeats the cycle. In addition, as described above in connection with dispensing glasses, mugs and pitchers of beer during normal operations in the second and third embodiments (FIG. 5) the display button 42 is also pressed to display the words VOLUME ADJUST.

Tap and Sensor Fitting

Figure 2B:
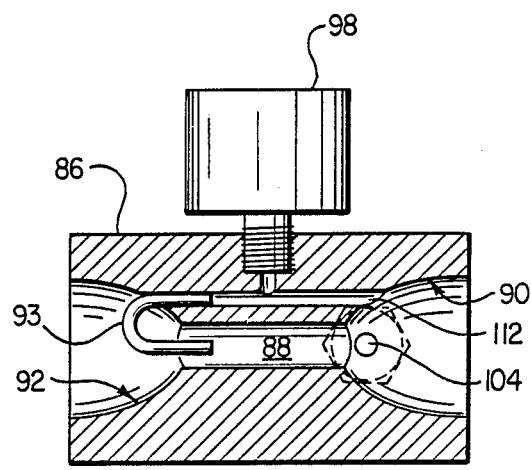
FIG. 2b is a view partly in section of a modified sensor fitting for the first embodiment of the invention.
Figure 2A:
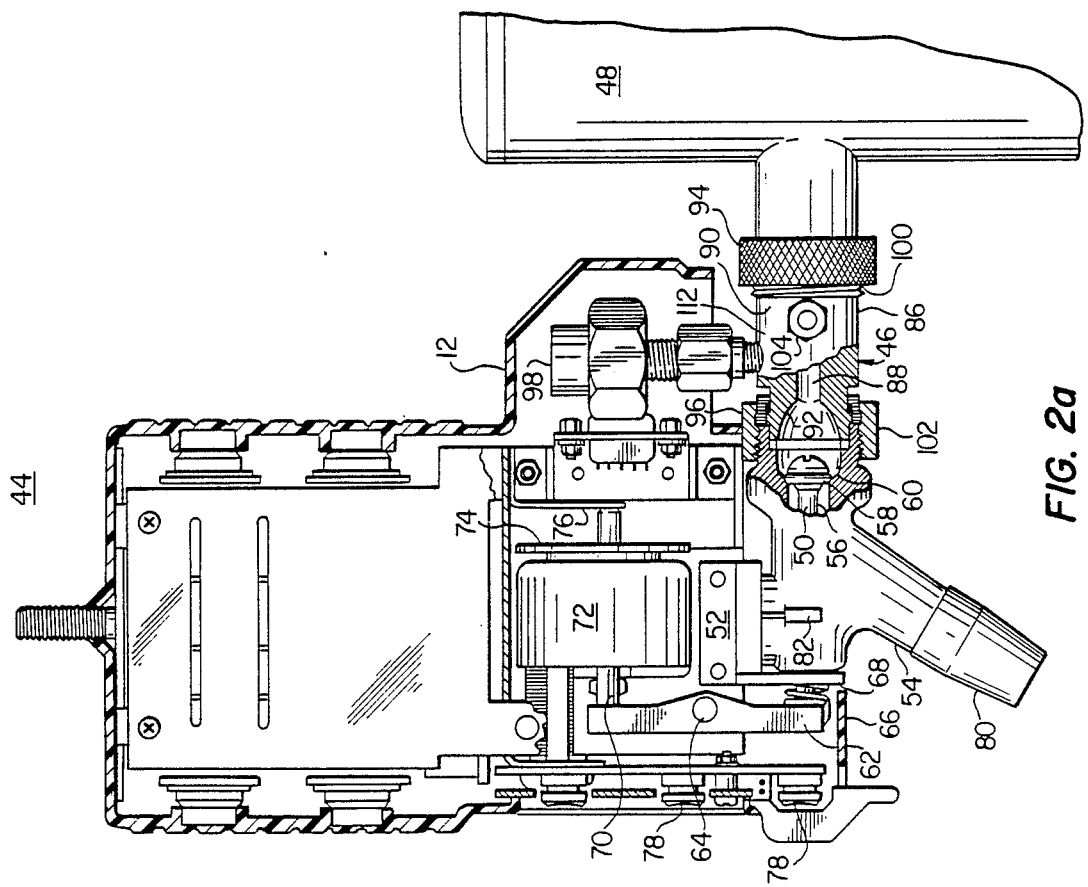
FIG. 2a is a side view of the computerized beer drspenser of the invention of FIG. 1 with a portion broken away to disclose the component parts of one of the dispensing taps including the sensor fitting of the first embodiment.
Figure 3:
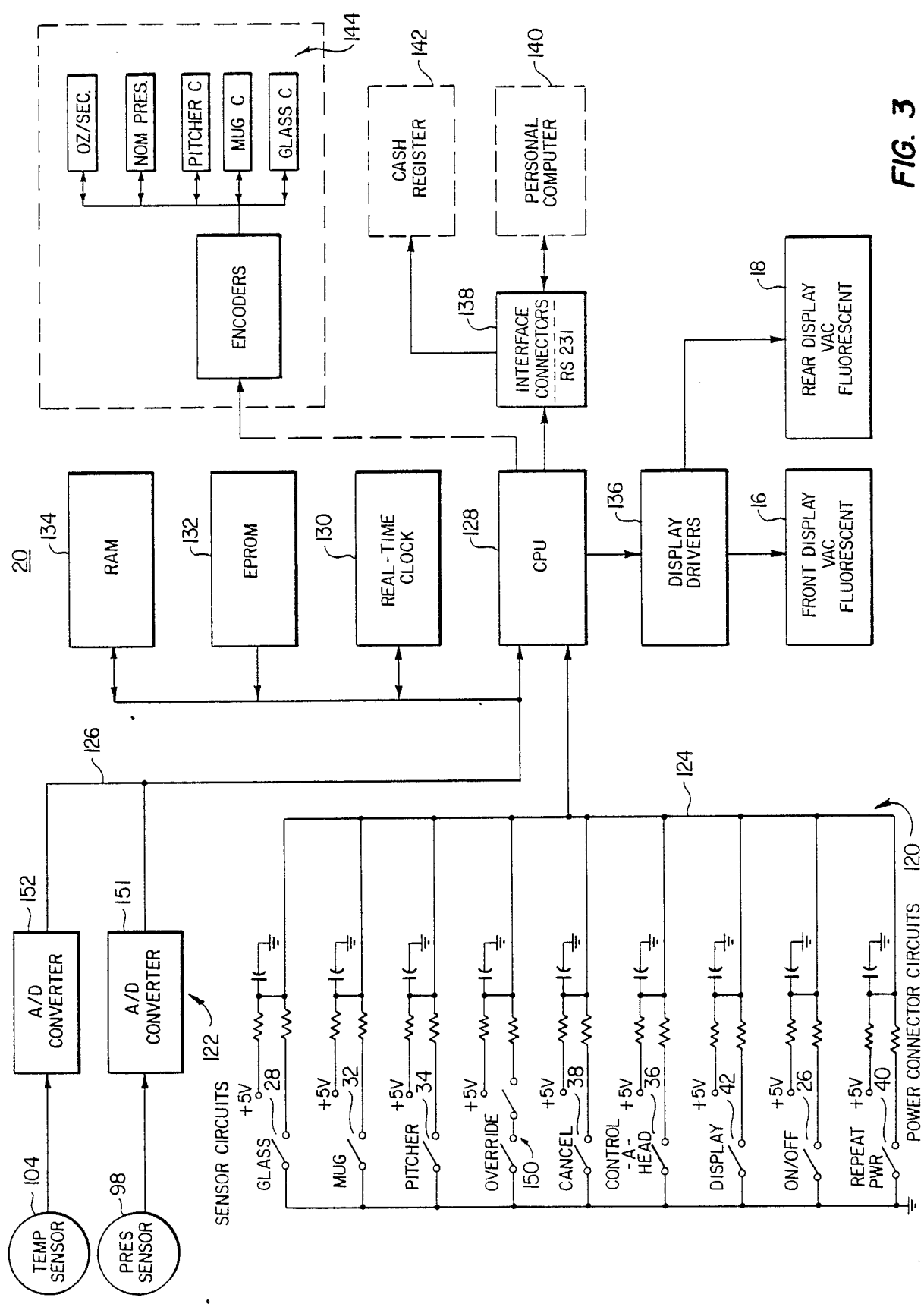
FIG. 3 is a schematic diagram showing in block form the computerized controller of the invention.

Referring now to FIGS. 2a and 2b, the tap 44, for example, includes a valve 50 attached to the housing 12 by a block 52. The valve includes a body 54 for directing beer to the service area. A valve stem 56 is slidably supported in the valve body for controlling the flow of beer. To prevent flow the valve stem includes a sealing member 58 which engages a valve seat 60 in the closed position. An actuating lever 62 is pivotally supported on the valve body for manipulating the valve stem between open and closed positions. The actuating lever 62 is supported for pivotal movement about a horizontal axis 64 The first end of the lever 62 is biased off by a spring 66 mounted between a stop 68 and the lever 62.

The lever 62 has a second end for engaging a plunger 70 of a solenoid 72. A magnetic type power booster 74 is connected to the solenoid and the plunger extends through the solenoid and solenoid booster to a spring type back stop 76. The spring type back stop 76 limits action of the plunger resulting from the return action of the lever bias spring. The solenoid 72 is controlled by the programmable controller 20. The programmable controller is connected to dome switches 78 beneath the GLASS SWITCH, and MUG, PITCHER, AND CONTROL A HEAD buttons to sense their positions. The dome switches 78 are actuated by pressing the GLASS, MUG, PITCHER AND CONTROL-A-HEAD buttons. Thus, the angular position of the lever 62 controls the open and closed positions of the valve.

Thus, to operate the tap 44, the solenoid 72 is energized by the programmable controller by selecting and pressing any one of the control-a-head, glass, mug, or pitcher buttons to drive the plunger 70 outwardly. This action of the plunger rotates the lever 62 about is axis 64 to push the valve from its seat thereby permitting beer to flow through the valve. Energization of the solenoid 72 is controlled by the programmable controller; thus, in the first embodiment after a continuously determined time based on actual fluid flow rate (pressure or velocity) or in the second and third embodiments after a time count the solenoid is de-energized and the spring 66 returns the valve to its seat to shut off the flow of beer.

It will be appreciated by those skilled in the art that the valve body 54 including a nozzle 80 if of metal construction may rise to the ambient temperature. Thus, until the valve body reaches the temperature of the beer, the beer flowing through will be heated to the extent of foaming. This foaming, is prevented by attaching a small thermoelectric heat pump 82 to the valve body which is controlled by a temperature sensor. Thus, the heat pump may be turned on for a preselected time period with turn on of the tap, and at any other time during which the beer temperature falls outside the acceptable temperature range. This feature may not be required where either the valve body or spout or both are formed of a plastic material; because, they are quickly cooled to the temperature of the beer as it flows through them.

The sensor fitting 46 (FIG. 2a) includes a short tube 86 having a constricted middle 88 between opposing externally threaded, internally flared ends 90 and 92. Couplers 94 and 96 connect the threaded ends 100 and 102, respectively, to the stanchion 48 and to the valve body 54. The tube wall forming the constriction is provided with recesses for receiving a pressure sensor 98 and a typical temperature sensor 104. The pressure sensor 98 is, for example, a Honeywell 243PSC156W pressure sensor manufactured by Honeywell Corporation.

The pressure sensor 98 connects to a horizontally disposed passage 112 which extends to the flared end 90. Thus, in operation beer under a first pressure at the flared end 90 passes through the passage 112 into the pressure transducer 98. The pressure transducer 98 also measures the pressure differences across the passage 112 and generates an analog signal indicative thereto. As the difference in pressure depends on the flow velocity, it must also depend on the quantity of beer passing through the pipe per unit of time (flow rate in cu. ft./sec. = cross-sectional area of the pipe in ft. $2 \times$ flow velocity in ft./sec.). Hence this pressure difference provides a measure for the flow rate for the programmable computer.

The modified sensor fitting 46 (FIG. 2b) is substantially that of the first embodiment above described. It differs in that the passage 112 to the pressure transducer 98 is extended to the flanged end 92 and a Pitot tube 93 has a first end attached to the corresponding end of passage 112 with its second or opposite end centrally positioned in the constricted passage 88 of the short tube 86 adjacent to the flared end 92. In this embodiment the constricted passage 88 has a diameter substantially larger than that of the first embodiment permitting a larger stream of beer to be dispensed without degrading the dispensing quality of the flowing beer. Although that portion of the passage 112 of the first fitting (FIG. 2a) could be eliminated, it has been found that the operation of the fitting of FIG. 2b is improved by its retention. In operation the Pitot tube 93, with its short right angled bend positioned vertically to the constricted passage 88 and with the mouth of the bent part directed upstream, coacts with the pressure transducer 98 to produce a pressure indicative of the velocity of fluid flow. As this pressure is indicative of the velocity of the fluid flow and differs from the pressure in the restricted passage, a different look-up table is required for timing the flow for the computer.

Computerized Controller

For all embodiments the programmed controller 20 computer (FIG. 3), which includes, for example, an 8031 microprocessor manufactured by Intel Corporation, is responsive to the keypad and glass selection switch for controlling the operation of the tap 44 (FIG. 1). The programmable controller (FIG. 3) in the first and second embodiments has its operating parameters entered by a suitable means such as a programmer's control panel or a personal computer through an RS 232 interface port or interface ports and keypad. The controller through its programs controls operation which includes, selectively, controlling the faucet's valve solenoid to pour the exact number of ounces to fill a glass, mug, or pitcher as selected by the appropriate keypad button, to display announcements during default (the time operational parameters are not being displayed), and to calculate the price of each transaction during the regular hours and at other scheduled times such as happy hour for output through an interface port to a cash register. The microprocessor includes the typical counters for counting the number of glasses, mugs, and pitchers filled, the number of cancellations made together with the amount of beer in ounces poured before cancellation, and the number of heads reformed on the containers and time thereof. Thus, the number of glasses, mugs, and pitchers sold per keg/shift/day/month or year is readily available together with the pouring times therefor for accounting purposes and for determining waste or unauthorized servings.

The programmable computer is programmed also to monitor the beer dispensing system operation. Thus, the computer is responsive in the first embodiment and optionally in the second and/or third embodiments to pressure and temperature sensors for monitoring the pressure and temperature of the beer in the tap and displaying status signals on the display to alert the operator of impending problems by flashing messages, and of failure by constantly displayed messages. For example, if the $CO_2$ bottle becomes empty, or for any reason the pressure or temperature falls within a danger zone immediately below or above acceptable ranges the computer sends a blinking message indicative of the problem, e.g. "Pressure Low/High;" "Temperature High/Low." If corrective action is not taken and the system deteriorates outside the danger zone into a "no-go" zone the computer provides a constant display of the messages and automatically shuts down the system.

In addition the programmable computer in the first embodiment monitors either the pressure differences of the fluid flow through the tap or the velocity of the beer flowing through the tap to detect wavering from preset parameters and to automatically adjust the time the beer dispenser valve is open. The time may be determined either from the pressure differences representing the pressure or velocity in the fitting either by means of look up tables stored in memory or by using the pressure to compute the fluid flow rate and the time required to dispense the required quantity. Thus, the time is repeatedly adjusted thousands of times a second so that the programmed volume will be properly dispensed. In this manner substantially no more "short" fills or "overfills" can occur.

In the second and third embodiments, the dispensing times are actually counted by the computer, and then stored in the computer for use by the computer in dispensing selected volumes of beer during the normal mode of operation. During normal mode of operation the count can be adjusted in increments to meet any changes in the desired volumes, resulting from changes in flow rate. This adjustment function if desired can be made a part of the programming mode.

The computerized controller 20 (FIG. 3) includes a plurality of power connector circuits 120 and sensor circuits 122 connected, respectively, by buses 124 and 126 to input terminals of a central processor unit (CPU) (microprocessor) 128. The CPU includes a plurality of counters and is connected to a real-time clock 130, an electrically programmable read only memory (EPROM) 132, and random access memory (RAM) 134. Display drivers 136 are connected to output terminals of the CPU 128, and the front and rear displays 16 & 18 are connected to the display drivers 136.

The CPU 128 is equipped with the connectors 138. The connectors include the RS232 type interface for connecting a personal computer 140 to the CPU and a connector for connecting a cash register 142 to the CPU for ringing up computed sales. In another embodiment, a connector is provided for connecting encoders 144 to the CPU. The encoders are connected to a plurality of dial means 146 for dialing in the selected pressure and number of ounces for the glasses, mugs, and pitchers.

The power connector circuits 120 include switching circuits for each of the following: the glass switch 28, mug switch 32, pitcher switch 34, override switch 150 (cancel switch 38 plus glass switch 30), cancel switch 38 control-a-head switch 36, interrogate (display) switch 42, the on/off/purge switch 26, and the repeat pour switch 40. To vary the switching arrangement for the third embodiment dip switches are used in conjunction with the normal/program switch replacing switch 26 to provide for a purge operation when the switch is in the program mode.

The sensor circuits 122 include the pressure and temperature sensing circuits. The difference pressure circuit includes the pressure sensor 98 and an analog to digital converter(ADC) 150. The ADC is connected to the pressure sensor for converting the analog signals representative of the difference pressure to digital signals for the CPU. The CPU 128 receives the digital signals representative of the difference pressure for storage in the RAM 134 for processing. While, the temperature sensor circuit includes the temperature sensor 110 connected to an ADC 152 for converting the analog temperature signals to digital signals for the CPU. The CPU receives and stores the temperature digital signals in the RAM 134 for processing.

The real time clock 130 is connected to the CPU for setting time and date, and thereafter for providing the time and date information signals for each operation performed by the system for accounting purposes.

The EPROM 132 is connected to the CPU and provides permanent storage of information such as the system operating parameters for readout. The EPROM contains, for example, a look up table for use in determining the proper dispensing time for filling the glasses, mugs, or pitchers. Or alternatively it may contain the algorithm for computing the dispensing time for the glasses, mugs, or pitchers from the pressure or velocity indicating signals.

The RAM 134 is connected to the CPU for temporary storage of system information for readout. The information includes the count, prices for the glasses, mugs, and pitchers, and amount of each sales for readout to the cash register.

The display drivers 136 decodes the information signals into display driver signals; these signals drive the front and back displays 16 and 18 to display operational information during active time and selected messages during operational standby times or periods of default. Periods of default as used herein means the periods when operational type information is not being displayed and additional commands are being awaited.

Programming Quantities for Dispensing

The beer quantities for dispensing are programmed as follows. First, in the first and second embodiments, a master key is used to turn the off/on/purge switch to the purge position, but, in the third embodiment the push button is pressed to initialize the system, then the code is entered to gain entry, and finally the normal/program key switch is turned to the program position. The computer controller then prepares itself for either a purging or a programming operation by redefining the keyboard functions and a PURGE OVERRIDE message is displayed.

Next, the DISPLAY button is pressed one time, and the message PROGRAM GLASS is displayed.

Then the desired glass is pressed against the GLASS switch and the beer faucet opens to allow beer to flow into the glass.

Next, when the beer reaches the desired level in the glass, the GLASS button is pressed a second time; the beer faucet closes to terminate the pour. The preceding step and this step may be repeated on a trial and error bases until the desired quantity for the glass is achieved.

With the last step completed, the desired volume time is programmed and ready for entry into memory.

Then the HEAD key is pressed to enter the programmed glass quantity into memory. The display exhibits the message ENTER GLASS on the top display and 0000 OUNCES on the bottom display.

Next, the approximate volume of beer contained in the glass is entered for use in the cancel operation mode by pressing and holding the REPEAT button down while observing the ounces being counted up on the message display. When the desired number of ounces is counted the REPEAT button is released. While 10 ounces is generally included in a 12 ounce glass, 8 ½ ounces is generally included in a 10 ounce glass. The REPEAT button is alternately pressed and released for single ½ ounce increments; thus it is pressed twice for 1 ounce. If an error is made on the up side, the CANCEL button is similarly used to count down to the desired quantity. During this step the display exhibits ENTER GLASS on the top display, and the number of ounces being counted on the bottom display.

Finally, the HEAD button is pressed and the quantity displayed is entered into memory. After entry, the display exhibits the message PROGRAM MUG.

A mug of the desired size is selected and mug and quantity is programmed in exactly the same manner as described above in connection with the glass. The display exhibits PROGRAM MUG, and subsequently ENTER MUG and 0000 OUNCES as before. After entry the display exhibits PROGRAM PITCHER.

In response to the display, a pitcher of desired size is selected, and the pitcher is programmed exactly as for the glass or mug. After entry, of the pitcher ounces, the display exhibits PROGRAM HEAD.

It will be appreciated by those persons skilled in the art that actuation of the DISPLAY button has no effect on programming, but allows one to stop or scroll through the messages and program entries. Further, it is not necessary to clear a program from memory before entering new data. New data will overwrite old data in memory.

Message Selection for Display

Messages are stored in memory for the first and second embodiments only as follows. First, the master key is used to turn the off/on/purge switch to the purge position and the computer control prepares itself for either a purging or programming operation by redefining the keyboard functions and the PURGE OVERRIDE message is displayed.

Next, the DISPLAY button is repeatedly pressed until the message PROGRAM DISPLAY appears on the display.

Next, the HEAD button is pressed and the computer control enters the program display mode and the first stored message is displayed on the display.

Next, the cancel button is pressed and QUEUE CLEARED is displayed for a two second interval and the first message on the queue list is displayed.

Next, one of two actions is taken: (1) the HEAD button is pressed; the computer control selects the displayed message as the first queued message for the display program, and the display exhibits the message MESSAGE ACCEPTED for a two second interval followed by the return of the original message; or (2) the DISPLAY button is pressed and the computer control advances to the second stored message and displays it on the display.

Then the DISPLAY button is pressed and held and the computer control advances to the next stored message, pauses for 2 seconds, and then begins advancing through the stored messages at 1 second intervals. After the last message the display exhibits the message MESSAGE QUEUE COMPLETE, and begins scrolling through the message list again. To select the next message for the queue, the DISPLAY button is released whereupon the computer control terminates the scrolling function and exhibits the current message.

Then the HEAD button is pressed and the computer control adds the above current message to the display queue.

Next the DISPLAY button is pressed to scroll to the next desired message or until the display exhibits the message MESSAGE QUEUE COMPLETE and the button released.

Then either the HEAD button is pressed and the computer control exits the program display mode and returns to the program mode, or the master key is turned to on or off and all programming operations are terminated.

Reprogramming Operating Parameters and Message Queue

After programming operations are completed and the computer control returned to the on or off normal operating mode, program parameters are modified as follows. In the first and second embodiments, the master key is inserted and the off/on/purge switch turned to the purge position; the display exhibits the PURGE OVERRIDE message. In the third embodiment after entry, the key switch is positioned at PROGRAM.

Then the DISPLAY button is pressed repeatedly to scroll to the desired parameter to be changed, for example, PROGRAM MUG message.

Next, using the newly selected mug to catch the beer, the MUG key is pressed and beer begins to flow into the mug. The MUG button is pressed again when the desired beer level is reached and the beer faucet closes to terminate the flow.

Then, the HEAD key is pressed and the computer control overwrites the previous mug quantity with the new program. The display now exhibits ENTER MUG XXXX OUNCES (where XXXX is a numeric quantity previously entered). If the new program quantity represents only a slight change, the existing ounce count may be retained by turning the master key to the on or off position; otherwise, the existing count if low is increased to the desired count by pressing the REPEAT button, or if high is reduced to the desired count by pressing the CANCEL button. The display exhibits the ounce count.

The new ounce count is then entered by pressing the HEAD button; the computer control overwrites the previous ounce count with the new one.

The master key is then turned to the on position in the first and second embodiments and to normal in the third embodiment, to resume normal operation.

With respect to the message queue for the first and second embodiments, the normal (default) message queue must be cleared before a new message can be entered. To change message queue, the master key is used to position the off/on/purge switch to the purge position. The display will exhibit the PURGE OVERRIDE message.

Then the DISPLAY button is pressed to scroll to the PROGRAM DISPLAY position which will be indicated by the display exhibiting the PROGRAM DISPLAY message.

The CANCEL button is pressed and the computer control exhibits a CLEAR message for a two second interval followed by a PROGRAM DISPLAY message. The display queue is now cleared for programming as above described. SYSTEM PURGING In all embodiments a purge function is provided to permit cleaning solutions to be flushed through the faucet, valve assembly and sensor adapter of the dispensing system to clean the system. By purging the system it is not necessary to remove the valve and disassemble it each time the system is to be cleaned.

For purging the beer keg is replaced by a keg containing a liquid cleaner and the master key in the first and second embodiments is used to turn the off/on/purge switch to the purge position and in the third embodiment after entry the key switch is turned to program. The computer control then permits all the dispensing functions to operate using beer from the beer keg as the cleaner but, bypasses the computation circuitry. Next, any or all of the dispensing buttons are pressed to pass either the cleaning solution or beer through the valve, faucet, and dispensing mechanism. If cleaning solution is used, water is then run through the system to remove any remaining cleaner.

Upon completion of the purging operation, if cleaning solution is used, the beer lines are properly attached to the keg beer supply and the HEAD button pressed several times to clear the line of any carbon dioxide. When beer is available again at the tap, the system is returned to service by turning the master key to the off/on/switch to the on position or to normal in the third embodiment.

Flowcharts

Figure 4A:
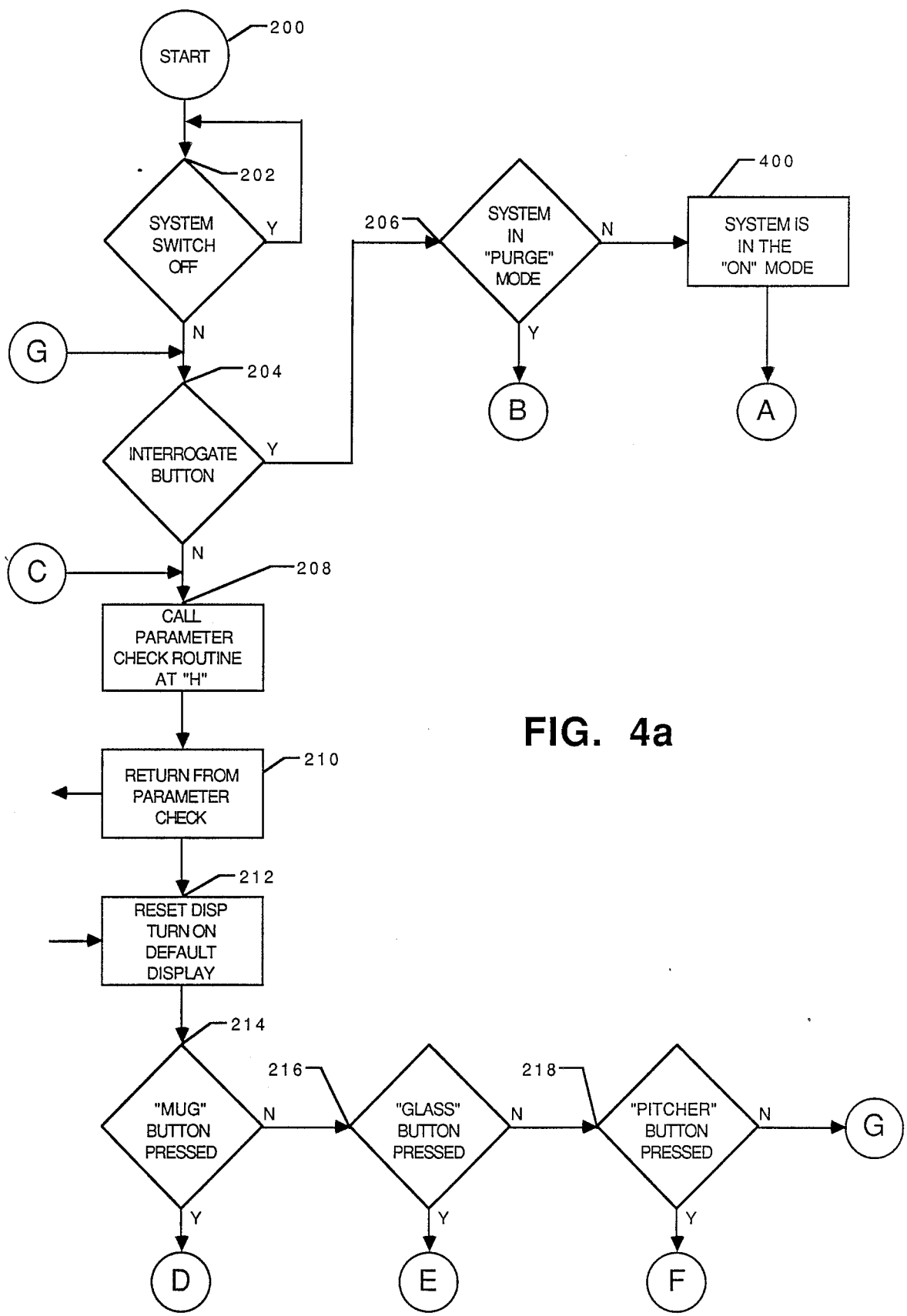
FIGS. 4a–4b constitute flowcharts for the operation of the computerized beer dispenser of the first embodiment of the invention and which can be modified to substitute subroutines of the third embodiment for the second embodiment of the invention.
Figure 4B:
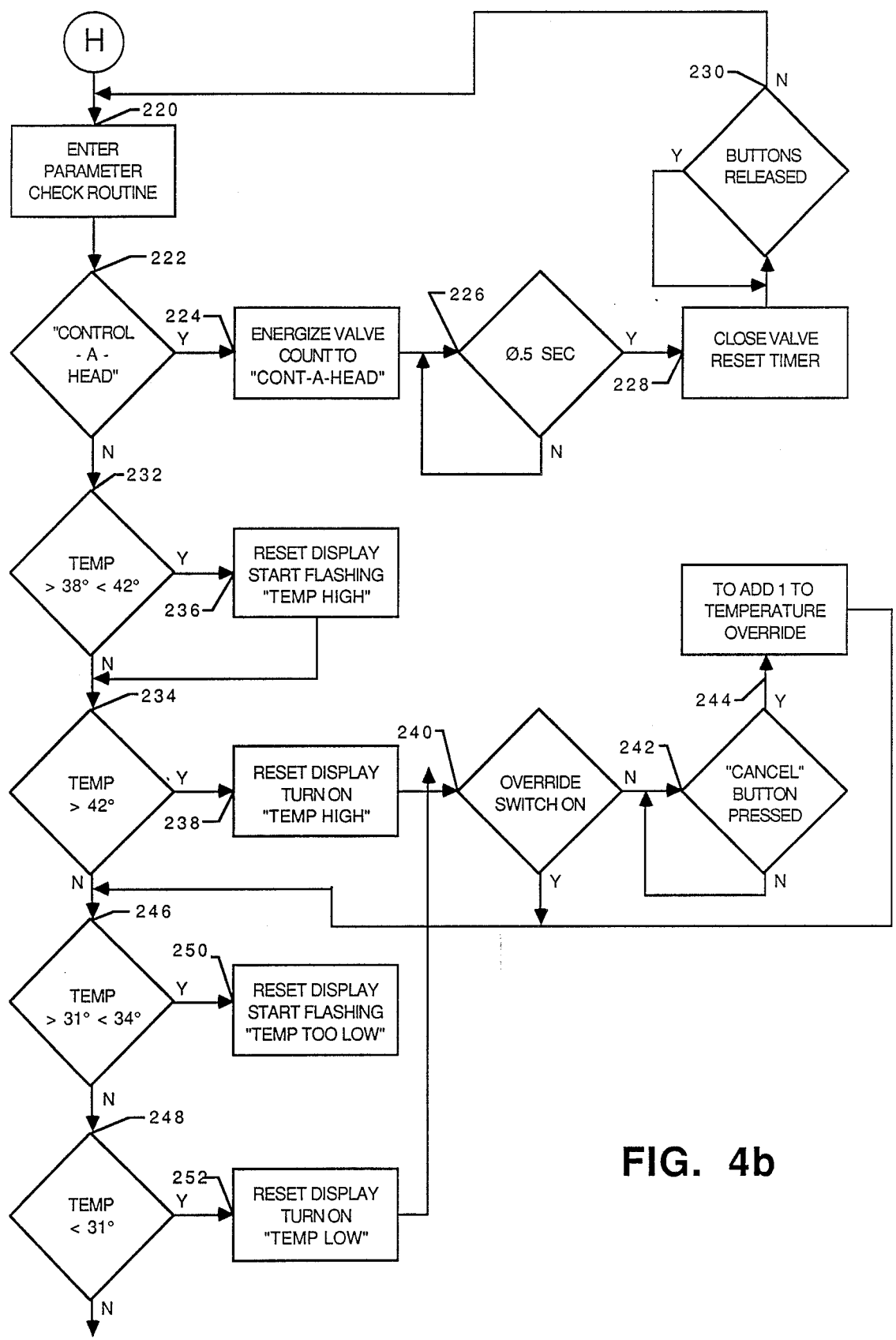
Figure 4B:
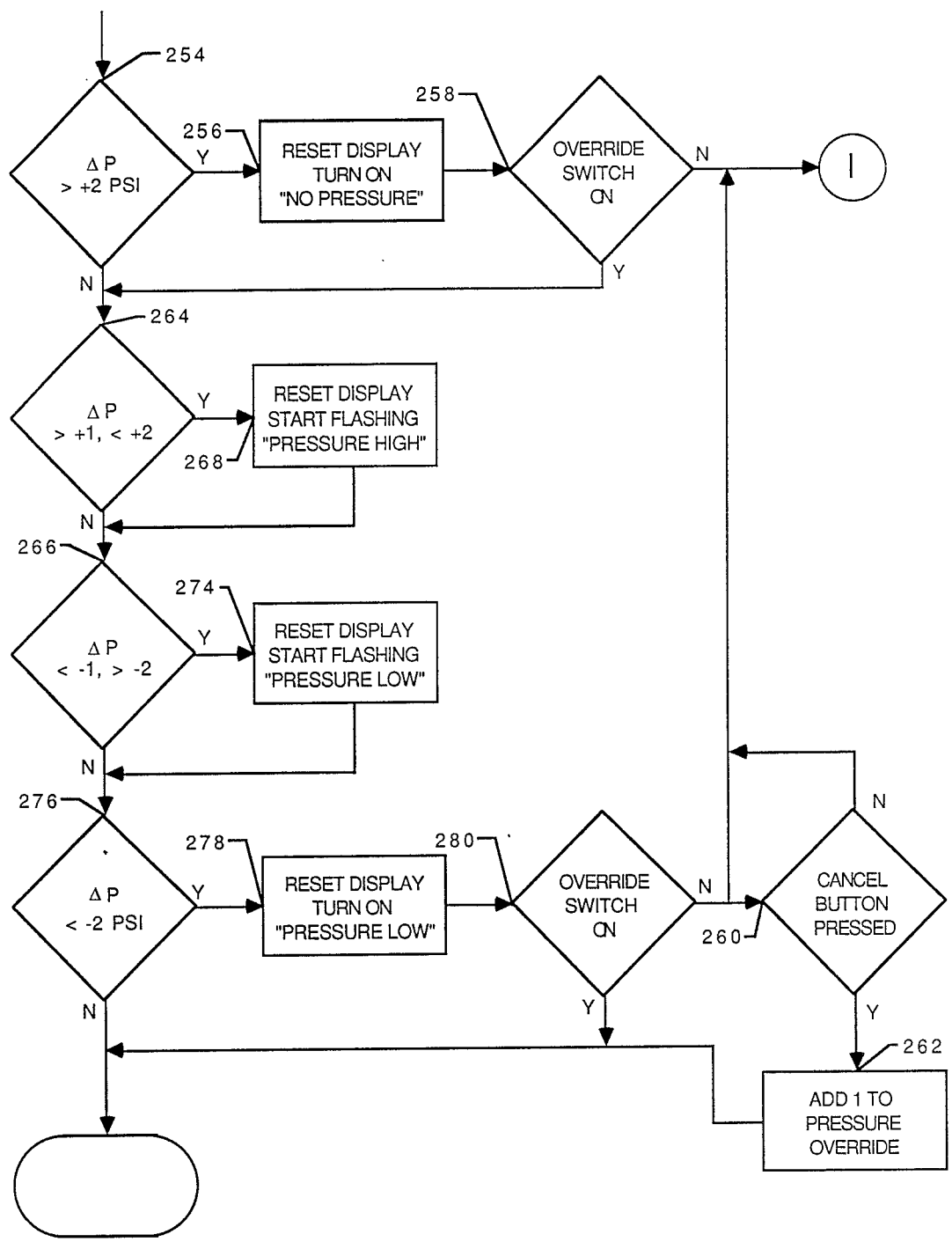

Referring now to FIGS. 4a–4g, the operation of the computerized controller for the first and second embodiments is described in conjunction with the operational flowcharts. The system in the first and second embodiments is initialized by turning the on/off/purge switch from the off position to either the on or purge position. Thus, at start 200 (FIG. 4a) a decision 202 is made whether the system switch is off. If off, return is made to start; else a decision 204 is made whether the interrogation (DISPLAY) button has been pressed; if Yes, a decision 206 is made whether the system is in the purge mode, else an instruction 208 is issued to enter a parameter check routine H (FIG. 4b). After return from parameter check at 210, an instruction 212 is issued to reset display or turn on default display. Then a decision 214 is made whether the mug button has been pressed; if Yes, the mug subroutine D (FIG. 4c) is called, else a decision 216 is made whether the glass button has been pressed. If the glass button has been pressed the glass subroutine E (FIG. 4c) is called up, else a decision 218 is made whether the pitcher button has been pressed. If the pitcher button has been pressed, the pitcher subroutine F (FIG. 4c) is entered, else return is made at G to the interrogate button decision 204.

Figure 4C:
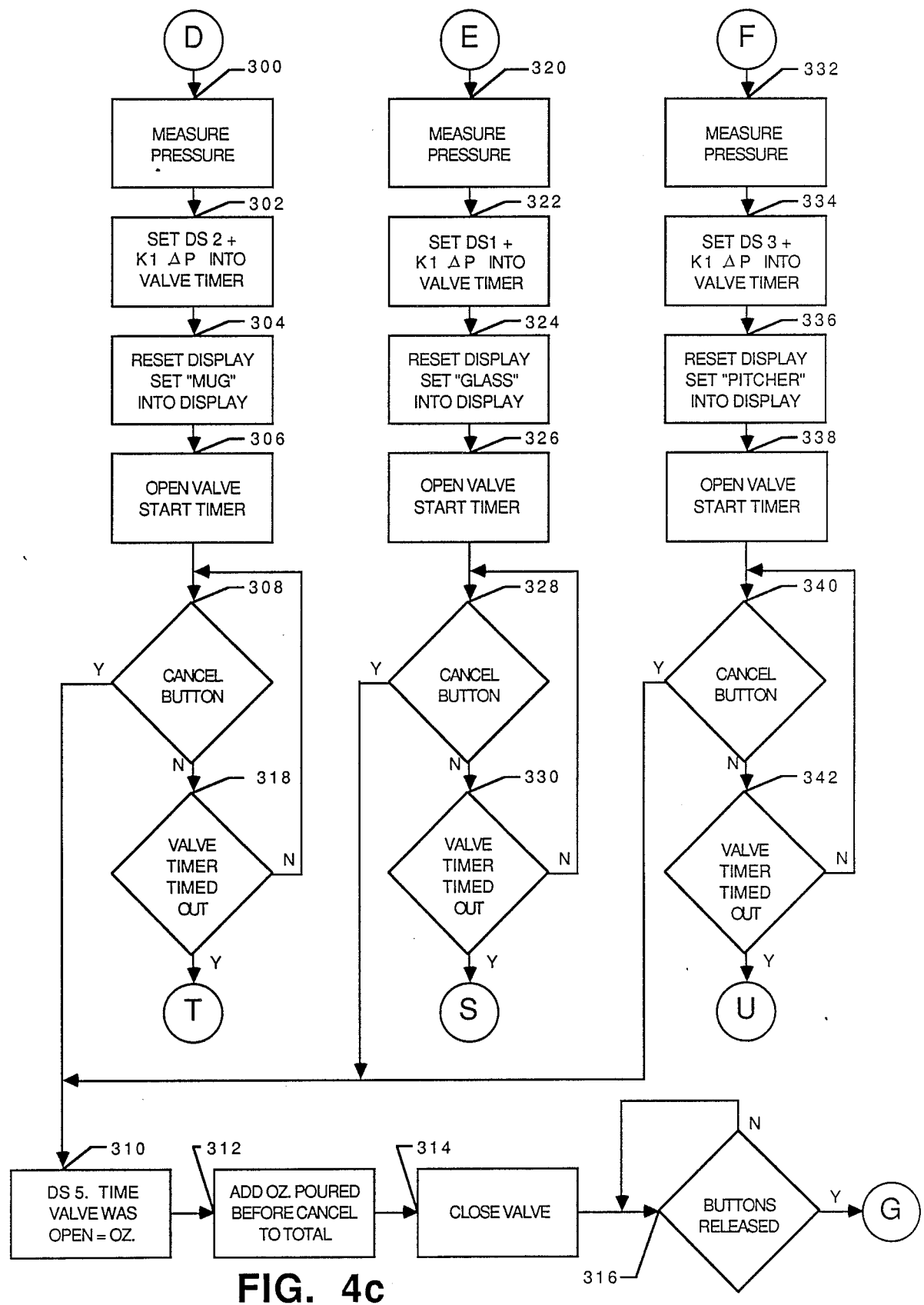
Figure 4D:
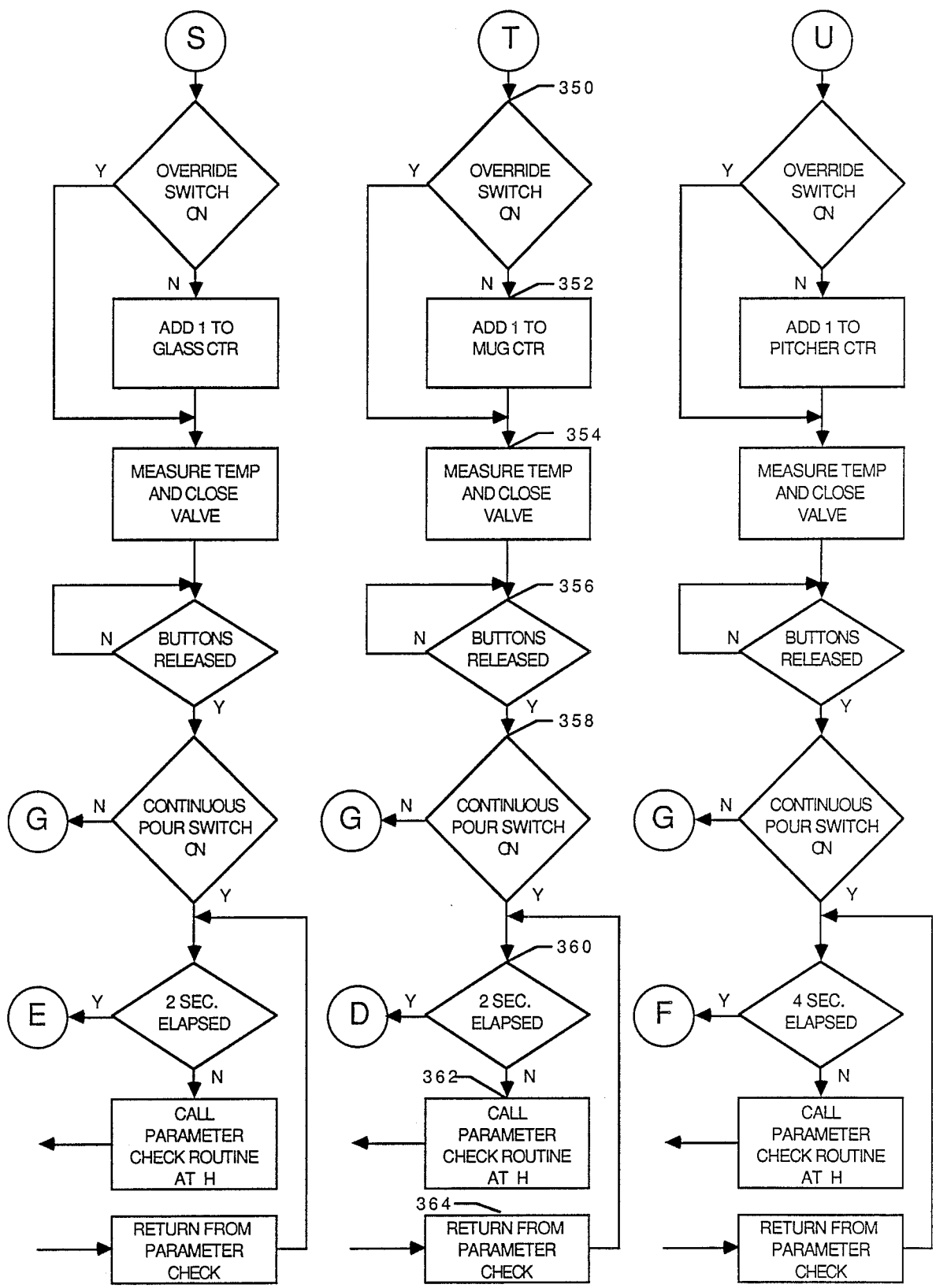
Figure 4E:
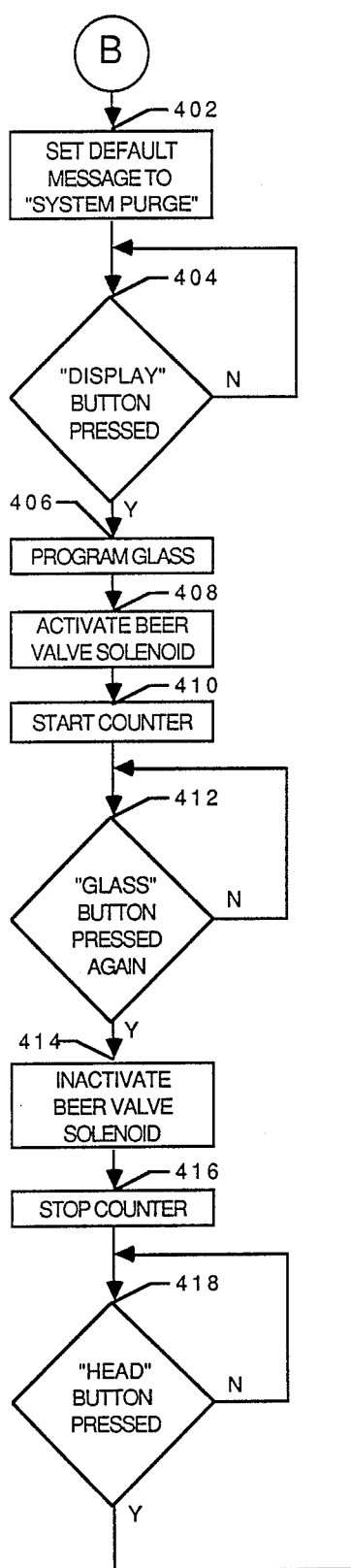
Figure 4E:
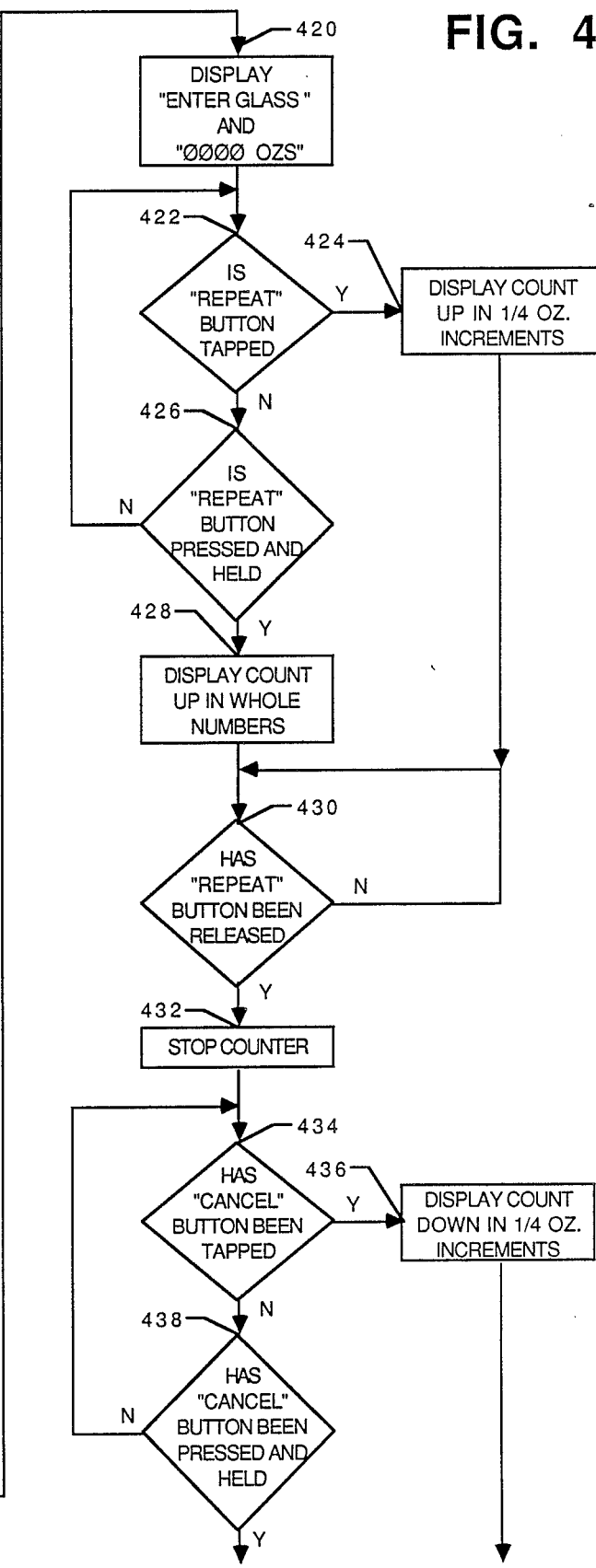
Figure 4E:
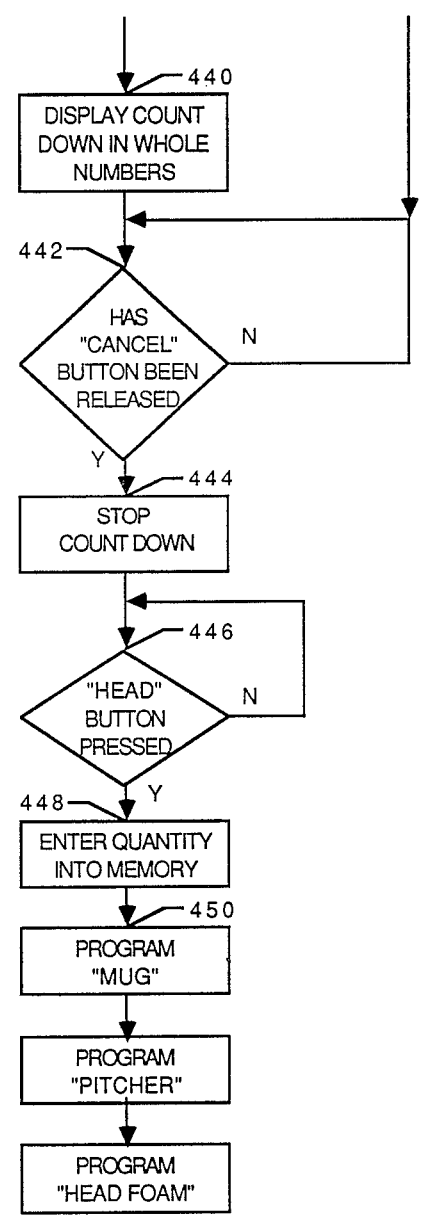

If the decision 206, as to whether the system is in the purge mode, is Yes the calibration subroutine B (FIG. 4e) is called up; else the system is in the on mode and an instruction 400 is issued to enter the counter subroutine A (FIG. 4d).

Parameter Check Subroutine

The parameter check subroutine H (FIG. 4b) begins with an instruction 220 to enter the parameter check call routine, and a decision 222 is made whether the control-a-head button has been pressed. If Yes, the control-a-head button has been pressed, an instruction 224 is issued to energize the beer dispensing valve and add one count to the control-a-head counter. Then a decision 226 is made whether 0.5 seconds has lapsed; if No, return is made to repeat decision 226 until Yes. When decision 226 is Yes, an instruction 228 is issued to close the valve and reset the timer. Then a decision 230 is made whether the buttons have been released; if Yes return is made to the control-a-head button pressed decision 222, else the decision 230 is repeated until the control-a-head button has been released. This action clears the system for parameter check.

Next, for the first embodiment and optionally for the second and third embodiments, decisions 232 and 234 are considered, respectively, whether the temperature of the beer is greater than 38 or less than 42, or greater than 42. If decision 232 is Yes, an instruction 236 is issued to reset the display and start flashing the message "TEMPERATURE HIGH"; else the decision 234 is made. If decision 234 is Yes an instruction 238 is issued to reset the display and turn on the TEMPERATURE HIGH message for constant display. Then a decision 240 is made whether the override switch is on, if No a decision 242 is made whether the cancel button has been pressed and the decision repeated until Yes, after which an instruction 244 is issued to add 1 to the temperature override count. If decision 240 is Yes, then decisions 246 and 248 are considered, respectively, whether the temperature is above 31 but less than 34, and whether the temperature is less than 31. If decision 246 is Yes, an instruction 250 is issued to reset display and start flashing the TEMPERATURE TOO LOW message; else the decision 248 is made, if Yes an instruction 252 is issued to reset the display and turn on the TEMPERATURE LOW message for constant display and return is made to the override decision 240. If the temperature decisions 232, 234, 246, and 248 are negative, the temperature is proper; then the pressure status is determined.

The determination of the pressure status in the first embodiment and optionally in the second and third embodiments begins with a decision 254 whether the pressure difference is greater than +2 psi.; if Yes, an instruction 256 is issued to reset the display and turn on the NO PRESSURE message for constant display. Then a decision 258 is made whether the override switch is on; if No, the keg count subroutine I is entered and a decision 260 is made whether the cancel button has been pressed, when Yes, an instruction 262 is issued to add 1 to the pressure override count and return. If decision 254 is No, then decisions 264 and 266 are considered, respectively, whether the pressure is greater than +1 and less than +2, and whether the difference pressure is less than −1 and greater than −2 psi. If decision 264 is Yes, an instruction 268 is issued to reset the display and start flashing PRESSURE HIGH message; if negative, then the decision 266 is made. If decision 266 is Yes, then an instruction 274 is issued to reset the display and to start flashing the PRESSURE LOW message; else a decision 276 is made whether the difference pressure is less than −2 psi. If decision 276 is Yes, an instruction 278 is issued to reset the display and turn on the "PRESSURE LOW" message. Then a decision 280 is made whether the override switch is on; then return is made to decision 260 whether the cancel button has been pressed; when pressed the instruction 262 is issued to add 1 to the pressure override count and return to the return from parameter check instruction 210 (FIG. 4a) is made. This return is also made when decision 280 is Yes.

With return from the parameter check, in the first and second embodiments, the system is displaying a public relations type message and the system is awaiting a mug, glass, or pitcher pouring decision to call up the mug, glass, or pitcher subroutines (FIG. 4c).

Mug, Glass, and Pitcher Subroutines

The mug subroutine D (FIG. 4c) in the first embodiment begins with instructions 300, 302, 304 and 306, respectively, to measure the difference pressure constantly, set DS2 +K1 difference pressure into the valve timer, reset display and set "mug" into display, and open valve and start timer. During timing of the pour a decision 308 is made whether the cancel button is pressed. If Yes, an instruction 310 is issued to determine the time the valve was open as the time represents the ounces that have been poured prior to cancellation. Then an instruction 312 is issued to add the number of ounces poured before cancellation to the total ounces poured. Next, an instruction 314 is issued to close the valve, and a decision 316 is made whether the cancel button has been released. Return is then made to G, FIG. 4a. If the decision 308 is No, then a decision 318 is made whether the time of the valve timer has expired; if No, return is made to decision 308 to determine if the cancel button is pushed before decision 318 becomes Yes. When Yes, the mug counter subroutine T is entered.

Mug Counter and Repeat Pour Subroutine

When the glass subroutine E is entered for the first embodiment, instructions 320, 322, 324, and 326 are issued, respectively, to measure the beer pressure, set DS1 +K1. difference pressure into the valve timer, reset the display and set "glass" into the display, and open the valve and start the timer. Then a decision 328 is made whether the cancel button is pressed; if Yes, the instructions 310, 312, and 314 and the decision 316 repeated. If No, a decision 330 is constantly made whether the time of the valve timer has expired without the cancel button being pressed. When the time has expired, the glass counter subroutine S is entered (FIG. 4d).

Similarly, when the pitcher subroutine F is entered, instructions 332, 334, 336, and 338 are issued, respectively, to measure the pressure difference, set DS3 +Kl difference pressure into the valve timer for determining constantly the time to pour a pitcher of beer, reset display and set "pitcher" in display, and open valve and start timer. Then a decision 340 is continuously made during the pour time whether the cancel button is pressed; if Yes, the instructions 310, 312, and 314 are issued and the decision 316 made and return is made to G FIG. 4a; else a decision 342 is made whether the time of the valve timer has expired without the cancel button being pressed; if Yes, then the pitcher counter subroutine U is entered (FIG. 4d).

The mug counter and repeat pour subroutine T (FIG. 4d) for the first and second embodiments begins with a decision 350 whether the override switch is on; if No, an instruction 352 is issued to add one to the mug counter and an instruction 354 is issued to measure temperature and close the valve. If decision 350 is Yes, skip is made to instruction 354. Next, a decision 356 is made continuously whether the buttons have been released and when released a decision 358 is made whether the repeat pour switch is on. If the repeat pour switch is on, a decision 360 is made whether two seconds have elapsed; if Yes, return is made to the mug pouring subroutine D (FIG. 4c); else instructions 362 and 364 are issued to call up the parameter check subroutine H (FIG. 4b) and after parameter check to return to decision 360 as to whether two seconds have elapsed. If decision 358 is No, return is made to G (FIG. 4a).

With the exceptions that: the glass counter and the pitcher counter are incremented by one for each glass or pitcher poured; and after two seconds have elapsed in the repeat pour mode, return is made to the glass and pitcher pouring subroutines E and F (FIG. 4c), respectively, the glass counter subroutine S (FIG. 4d) and the pitcher counter subroutine U are identical to the mug counter subroutine. Thus, the mug subroutine with these changes need not be repeated for the glass and pitcher counter subroutine E and F.

Returning now to FIG. 4a and to the decision 206 whether the beer dispensing system is in the purge mode, if Yes, the calibration subroutine B (FIG. 4e) is entered, else an instruction 400 is issued indicating that the system is in the on mode and the accounting subroutine A (FIG. 4f) is called.

Calibration Subroutine

The calibration subroutine B (FIG. 4e) in the first and second embodiments begins with an instruction 402 to set default message to SYSTEM PURGE for display. Then a decision 404 is made whether the display button has been pressed; if No, the decisior is repeated until the decision is Yes. When Yes, an instruction 406 is issued to display the message PROGRAM GLASS, and instructions 408 and 410 are issued to activate the beer valve solenoid to begin the flow of beer and to start the ccunter. Then a decision 412 is made whether the GLASS button has been pressed again; if No, the decision is repeated until the GLASS button has been pressed and instructions 414 and 416 issued to inactivate the solenoid to stop the flow of beer and to stop the counter. Then a decision 418 is made whether the HEAD button has been pressed; when Yes, the programmed quantity is entered into memory and an instruction 420 issued to display the message ENTER GLASS AND 0000 OUNCES. Then a decision 422 is made whether the REPEAT button is being tapped or pressed and held. If tapped, an instruction 424 is issued to display the count ½ ounce increments. Then a decision 426 is made whether the repeat button is being pressed and held. If No, return is made to decision 422; if Yes, an instruction 428 is issued to display the count-up in whole numbers. Next, a decision 430 is made whether the REPEAT button has been released, when released an instruction 432 is issued to stop the counter. Then a decision 434 is made whether the CANCEL button has been tapped or pressed. If tapped an instruction 436 is issued to count-down in ¼ increments and jump to decision 442; if Yes, a decision 438 is made whether the cancel button has been pressed and released. If No, return is made to decision 434; if Yes, an instruction 440 is issued to count-down in whole numbers. Then a decision 442 is made whether the CAN- CEL button has been released; if Yes, an instruction 444 is issued to stop the count-down. The correct number of ounces is now being displayed. Next a decision 446 is made whether the HEAD button is pressed; when pressed an instruction 448 is issued to enter the quantity into the memory for use in connection with the cancel mode of operation, and an instruction 450 is issued to display the message PROGRAM MUG.

The programmable controller is similarly programmed for the mug, pitcher, and head of foam in sequence. Thus, the flowchart is not repeated for these operations.

Accounting Subroutine

Figure 4F:
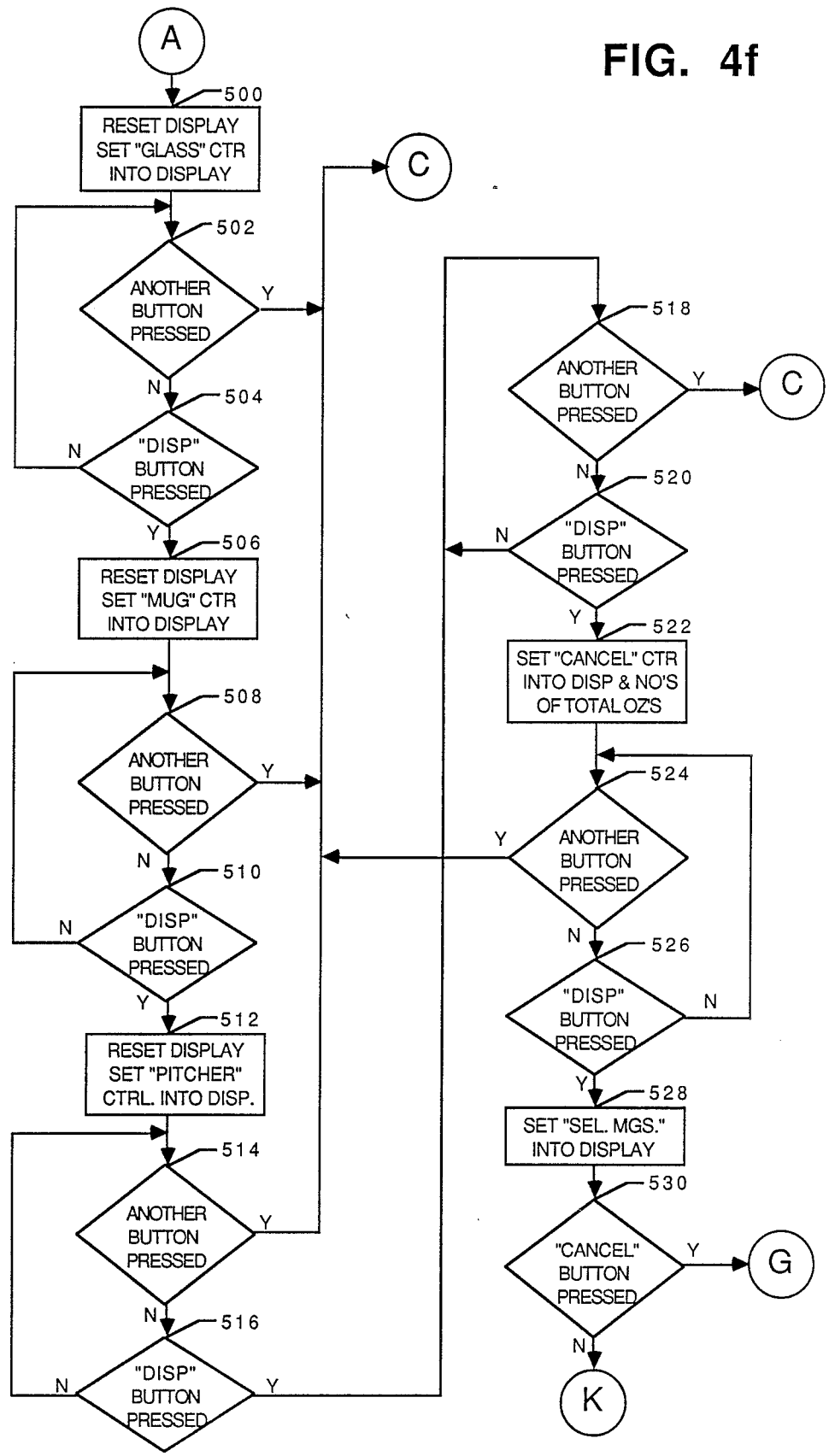
Figure 4G:
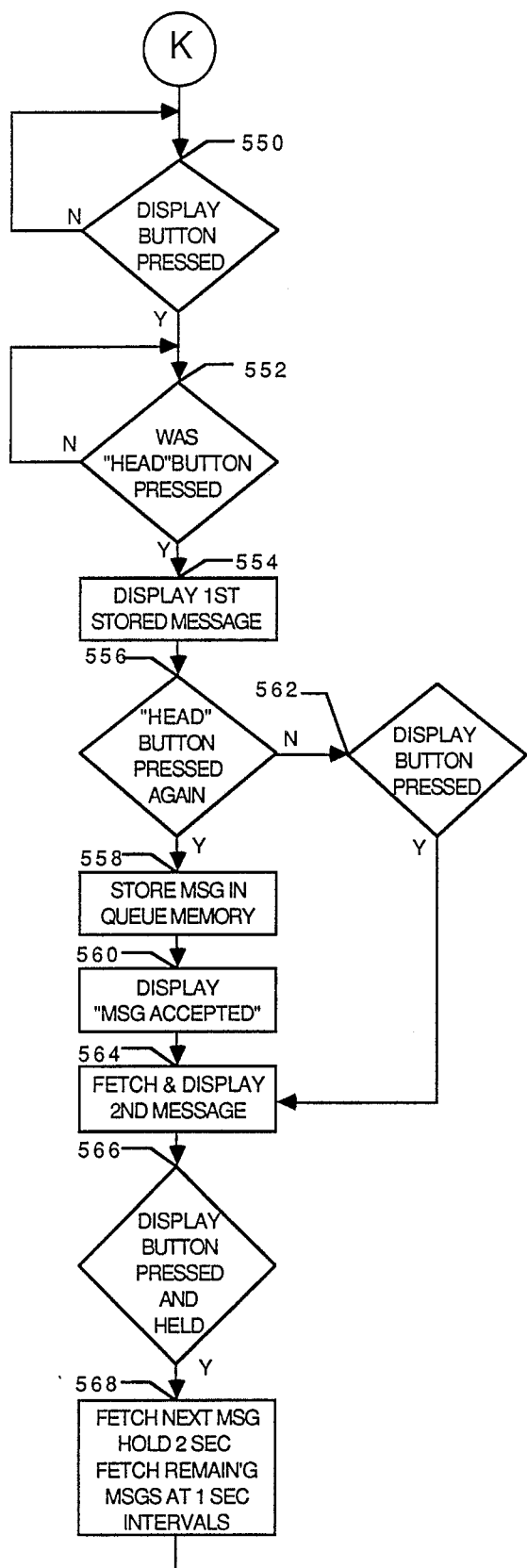
Figure 4G:
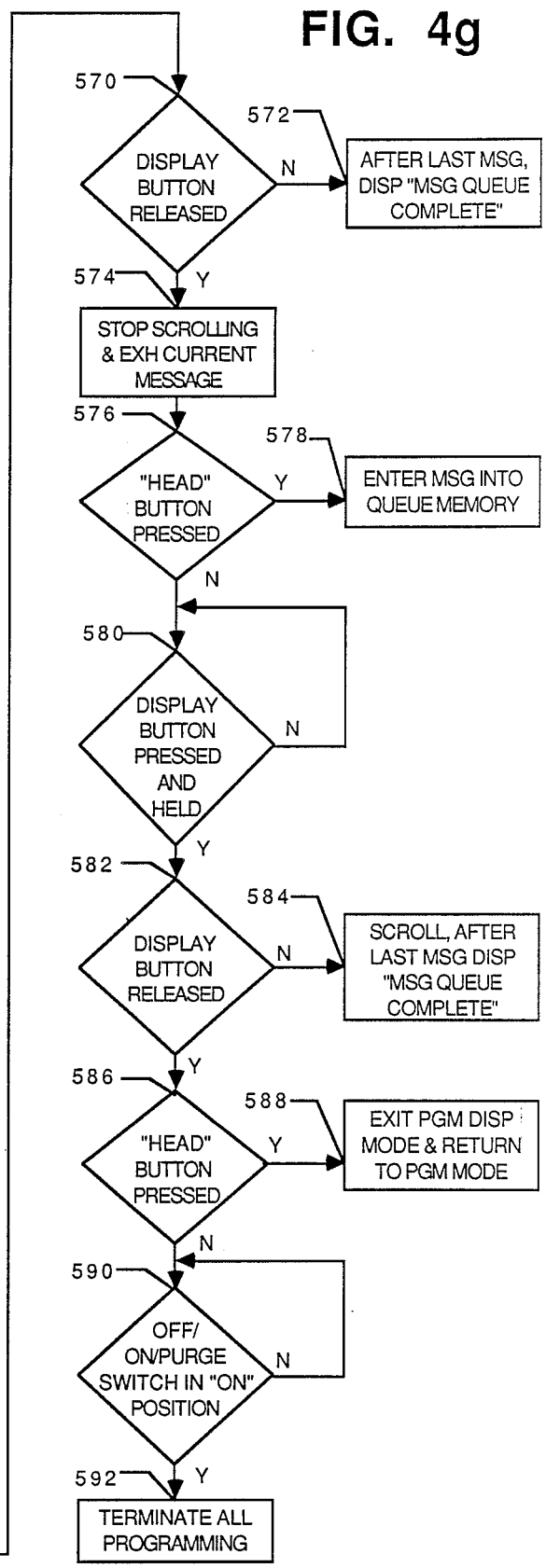

Referring now to FIG. 4f, with the system in the on mode, the accounting subroutine begins with an instruction 500 to set the glass counter's count into display. Next, a decision 502 is made whether another button has been pressed; if Yes, return is made to C (FIG. 4a) and the beer dispensing routine repeated beginning with the instruction 208 to call parameter check subroutine; if No, a decision 504 is made whether the display button has been pressed. If the display button has not been pressed return is made to decision 502 until the decision 504 is Yes; when Yes, an instruction 506 is issued to set mug count into the display.

Next, a decision 508 is made whether another button has been pressed; if Yes, return is made to C (FIG. 4a) and the beer dispensing routine repeated beginning with the instruction 208; if No, a decision 510 is made whether the display button has been pressed. If No, return is made to decision 508 and repeated until the decision 510 is Yes. Then an instruction 512 is issued to set the pitcher count into the display, and decision 514 is made whether another button has been pressed. If Yes, return is made to C (FIG. 4a) else a decision 516 is made whether the display button has been pressed. If decision 516 is No, return is made to decision 514 and repeated until decision 516 is Yes, then a decision 518 is made whether another button has been pressed. If decision 518 is Yes, return is made to C (FIG. 4a) else a decision 520 is made whether the display button has been pressed. If No, return is made to decision 518 and the decisions repeated until the display button has been pressed; if Yes, an instruction 522 is issued to display the number of cancels and the numbers of total ounces poured prior to cancels.

Next a decision 524 is made whether another button has been pressed; if Yes, return is made to C (FIG. 4a); if No, a decision 526 is made whether the display button has been pressed. If No, return is made to decision 524 and repeated; if Yes, an instruction 528 is issued to set SELECT MESSAGES into the display.

Next, a decision 530 is made whether the cancel button has been pressed; if Yes, return is made to G (FIG. 4a) to begin the beer dispensing routine again with the interrogate decision 204; else the default message subroutine K (FIG. 4g) is called.

Default Message Subroutine

The default message subroutine begins with a decision 550 (FIG. 4g) whether the display button has been pressed and the message PROGRAM DISPLAY exhibited by the display. If Yes, a decision 552 is made whether the HEAD button has been pressed; if Yes, an instruction 554 is issued to display the first stored message. Then a decision 556 is made whether the HEAD button has been pressed again. If Yes, an instruction 558 is issued to input the message being displayed into the queue memory and an instruction 560 issued to display the message MESSAGE ACCEPTED for two seconds and return to display the original message; else a decision 562 is made whether the DISPLAY button has been pressed. If the decision 562 is Yes, an instruction 564 is issued to fetch the next stored message for display. Next a decision 566 is made whether the DISPLAY button is pressed and held; if Yes, an instruction 568 is issued to fetch the next message for a two second display, and thereafter to fetch the remaining messages at one second intervals for display. After the last message is displayed a decision 570 is made whether the display button has been released. If No, an instruction 572 is issued to display the message "Message Queue Complete"; if Yes, an instruction 574 is issued to stop scrolling and exhibit current message. Then a decision 576 is made whether the HEAD button has been pressed; if Yes, an instruction 578 is issued to enter the message into the queue memory; else a decision 580 is made whether the DISPLAY button has been pressed and held again. If No, the decision is repeated until Yes. Then a decision 582 is made whether the DISPLAY button has been released. If No, an instruction 584 is issued to scroll the remaining stored messages and at the end thereof to display the message MESSAGE QUEUE COMPLETE, if Yes, a decision decision 586 is made whether the HEAD button has been pressed; if Yes, an instruction 588 is issued to exit program display mode and return is made to the program mode. Else, a decision 590 is made whether the off/on/purge switch has been moved from the purge position to the on or off position; if Yes, an instruction 592 is issued to terminate all programming operations.

It will be appreciated by those skilled in the art that instructions can be issued to read the real clock and add the time and date to the transactions, and to the accounting actions. Further, with respect to the accounting, instructions can be issued to store the accounting information for each accounting period, and to provide a running record for tax purposes.

Operation of Third Embodiment

In operation, after the beverage dispensing unit of the third embodiment has been installed and with the on/off push button switch 510 (FIG. 5) set in the off position, the on/off switch is set on the on position and the beverage dispensing unit is initialized.

After initialization, the display key 42 is pressed if necessary until the project "Program Code" is displayed and the access code is entered using the keypad 30 switches. Then the display key is prassed until the prompt "Program Glass Time" is displayed. After programming the glass time, the display is pressed to display in sequence the prompts "Program Mug Time" and "Program Pitcher Time." The volumes for glasses, mugs, and catchers are entered into the controllers memory first by placing a glass, mug, or pitcher under the top and pressing the corresponding switch to start the beverage flow and a counter of the controller. When the desired volume has been poured into the glass, mug, or pitcher, as appropriate, the switch is pressed again to stop the flow and the counter. This count is saved and entered in memory for use during normal operation. The volume count of beverage dispensed is then either incremented or decremented as required for normal operation.

After programming the on/off switch is pressed off. Thus, thereafter the program mode selection of the normal/program key switch calls up the prompt "Purge" operation program for cleaning the tap. Purge is called up at any time during programming by pressing the DISPLAY key until the purge prompt is displayed.

After cleaning the tap, the key switch is turned to the normal operation position and the unit is ready for operation.

For normal operation, the operator presses the on/off switch to the on position and enters the code for accessing the unit. Upon entry of the proper code, the main program is called up and the unit is operated to dispense singly or repeatedly glasses, mugs, and pitchers of the beverage and to put "beer" heads on those requiring new heads. Dispensing selections may be canceled. Each operation is counted and the total in ounces computed.

If during normal operations, the volume dispensed during the on time changes for any reason including pressure failure or increase, the count may be incrementally changed upwardly or downwardly within limits to dispense the desired volume. This adjustment can be made either a part of the normal or program operations depending on the owner's preference.

The unit can be interrogated either in the normal or program mode by pressing the display key until the "interrogation" prompt is displayed indicating that the interrogate program has been called up. In the normal mode the number of glasses, mugs, and pitchers and heads dispensed can be displayed together with the total number of ounces. In the program mode the operating parameters can be displayed, and the glass, mug, and pitcher counters and total ounce counter can be cleared.

At any time during the operation the off key can be pressed to go to an OFF program which requires entry of the access code for a new start up.

Flow Diagram For Third Embodiment

Referring now to FIGS. 6a–6k which constitute a flowchart of the beer dispensing characteristics of the third embodiment of the invention. In the third embodiment using the normal/program key switch the purge and program modes are selected by setting the switch to program and the "Purge" prompt is displayed for purging the system; the display key is pressed to enter the programming mode.

Figure 5:
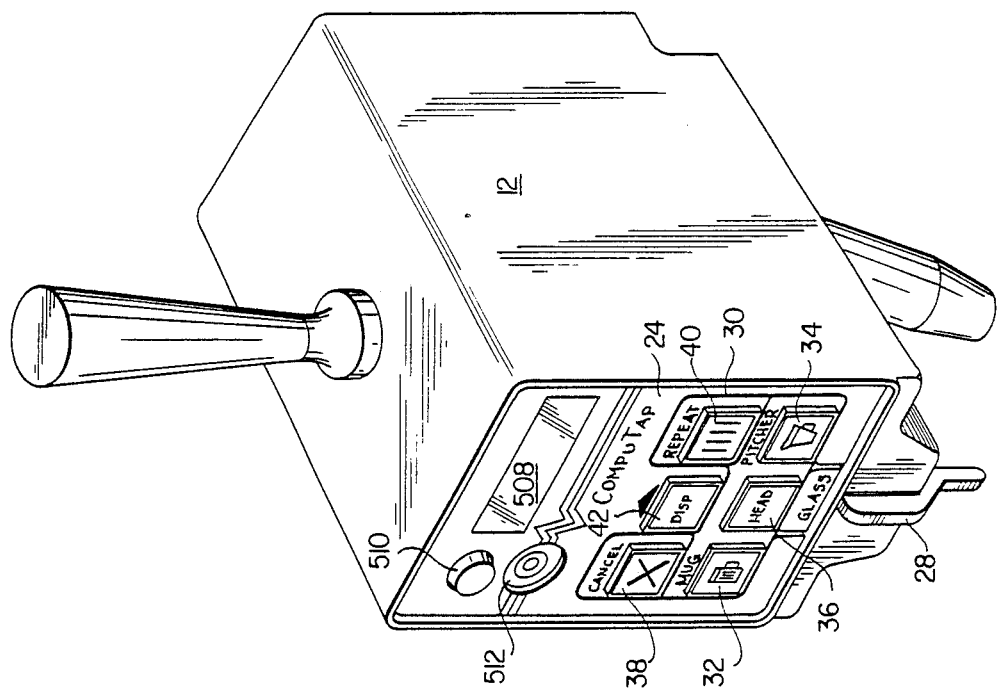
FIG. 5 is an isometric view of the computerized beer dispenser constituting the third embodiment of the invention.
Figure 6A:
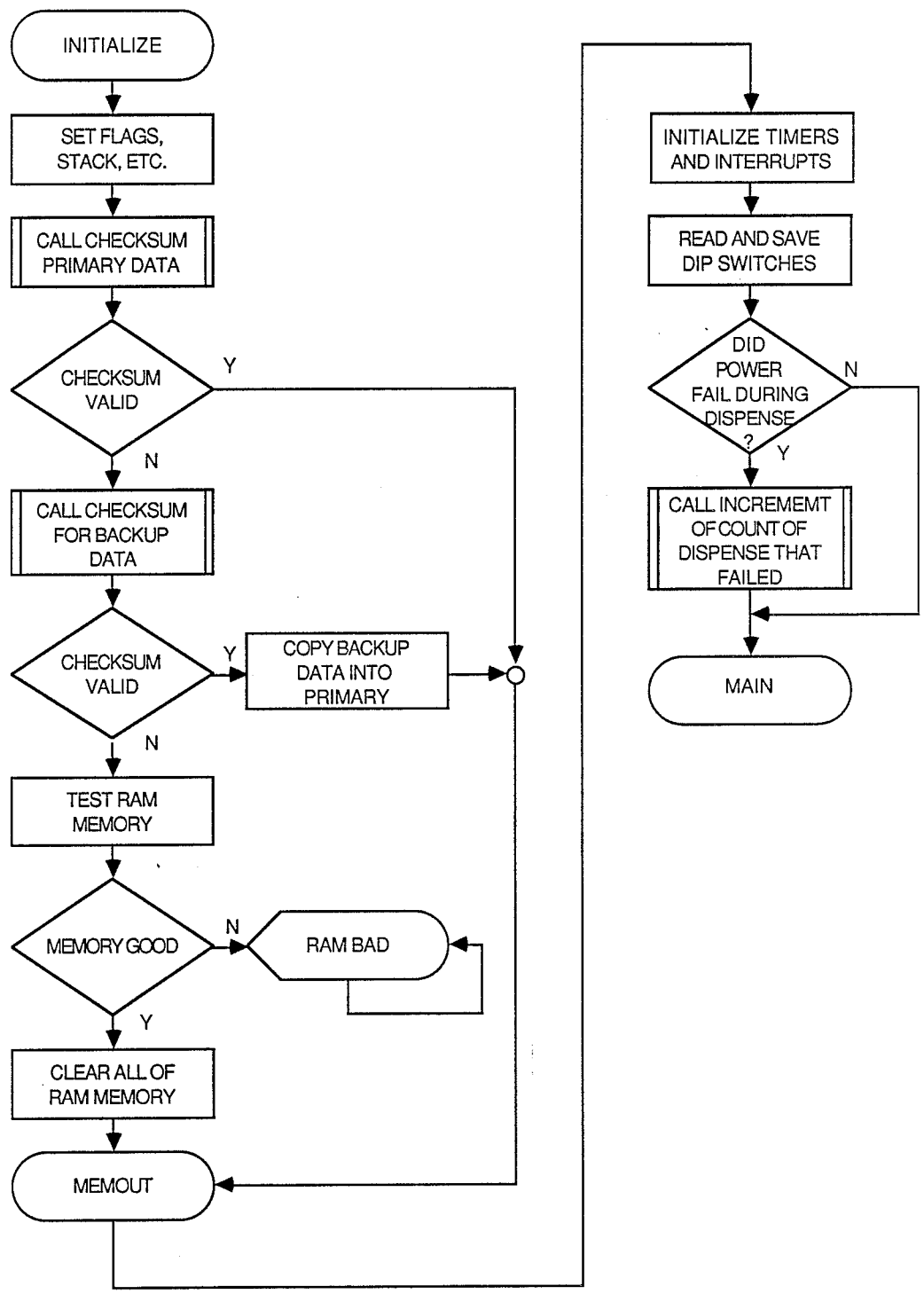
Figure 6B:
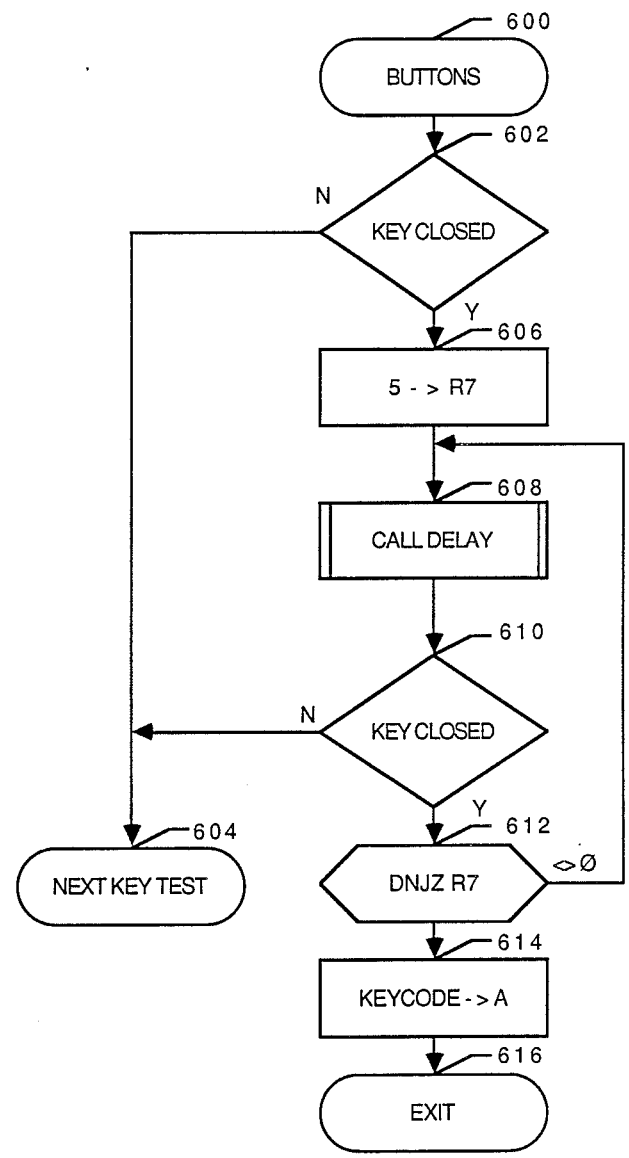
Figure 6F:
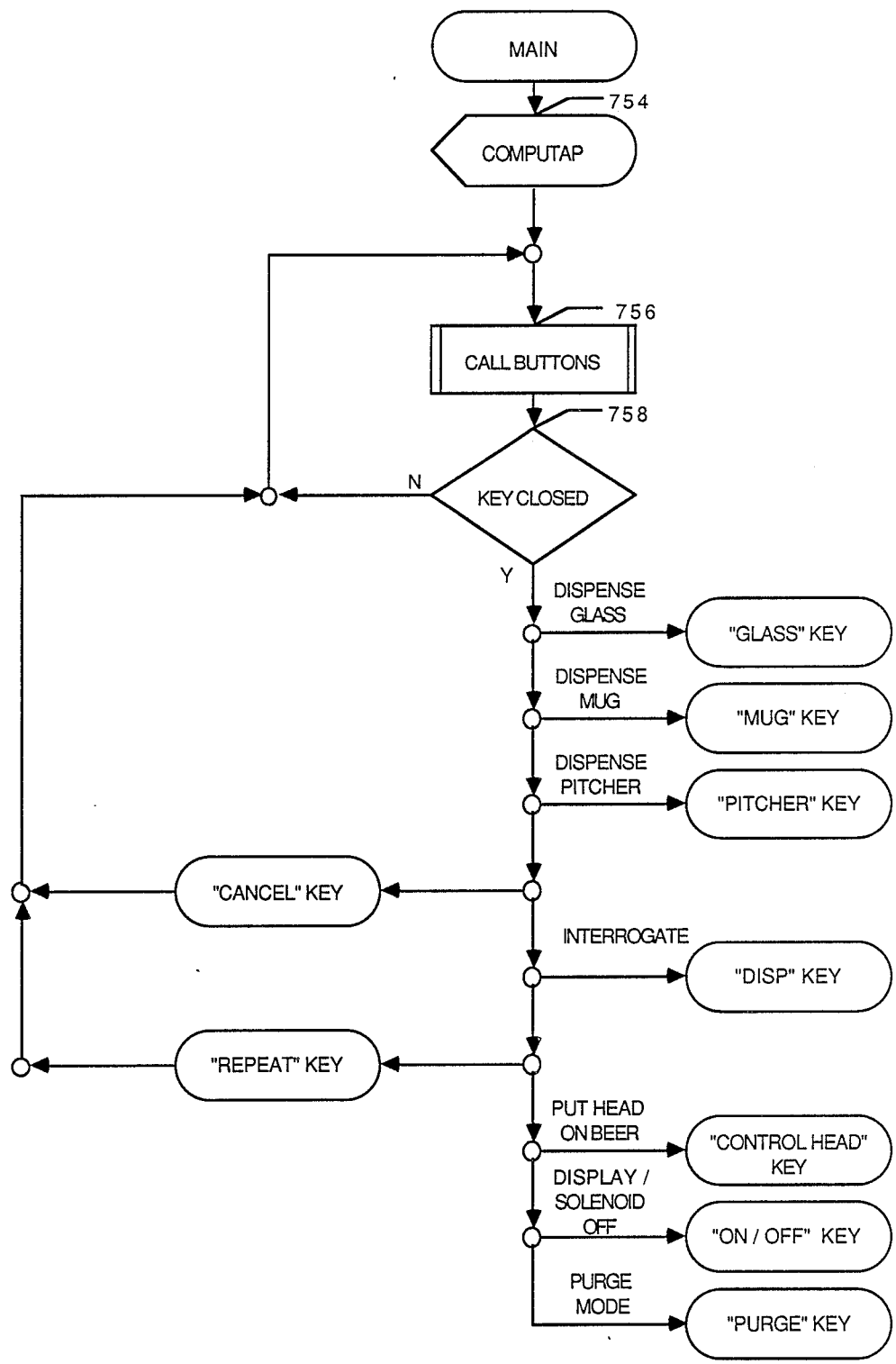

The beer dispensing system of the third embodiment is initialized upon pressing on the on/off button switch 510 (FIG. 5). The initialization routine as indicated includes the steps of FIG. 6a. As these steps are well known in the art a further description thereof is not provided. After initialization, entry of the access code and turning the key switch to the normal position, exit is made to the main program (FIG. 6f).

Call Buttons Subroutine

A buttons subroutine (FIG. 6b) is used in the main program as well as in most of the other subroutines for detecting the pressing of a key or the switch position. The description of the buttons subroutine provides a valuable assist to the operation and description of the program and other subroutines; thus, it is described first. The buttons subroutine at start 600 makes a decision 602 whether a key has been closed. If No, exit 604 is made to await the next key pressed test; if Yes, before a determination that a key has been closed is made, (rebouncing) instructions 606 and 608 are issued, respectively, to determine if the button is closed during five checks of a register (R7) made during a time delay subroutine in which another register is loaded with a delay time and count down is made to zero. After step 608, a decision 610 is made finally whether a key has been closed. If No, exit is made to next key test 604 to await the pressing of a key; if Yes, a combined decide and jump to zero instruction 612 is made. If the register count has not reached zero, return is made to call delay subroutine 608; otherwise an instruction 614 is issued to return a key code of TABLE II to the calling program or subroutine for the key pressed and exit 616 is made. It is to be noted that for purposes of simplifying the description of the program and subroutines the call buttons subroutine decisions are represented therein by a single key closed decision in which a No indicates all keys have been monitored and none found to be pressed and a Yes indicates a key being pressed.

TABLE II

| KEY CODES RETURNED TO CALLING PROGRAMS |  |
| --- | --- |
| 0 | FOR NO KEY CLOSED |
| 1 | FOR GLASS |
| 2 | FOR MUG |
| 3 | FOR PITCHER |
| 4 | FOR CANCEL |
| 5 | FOR INTERROGATE (DISP) |
| 6 | FOR CONTINUOUS POUR (REPEAT) |
| 7 | FOR CONTROL-A-HEAD |
| 8 | FOR ON/OFF IN "ON" POSITION |
| 9 | FOR OVERRIDE (PURGE KEY POSITION) |

In the programs, routines and subroutines including the buttons subroutine all keys and switches are indicated with their effect noted. Thus, the first use of the buttons subroutine will describe in detail the effect of the key presses; thereafter, only the significant keys will be described.

Security Subroutine

After turn on with the program mode selected, access to the system is through a security code entered using a security routine (FIG. 6c, page 1). The access security code 618 is entered when the display key has been pressed to display the program code prompt 620 and a call 622 issued for the buttons subroutine. The call buttons subroutine makes a decision 624 whether a key has been pressed. If No, an instruction 626 is issued to go to the main program (FIG. 6f). If Yes, and the key pressed is determined to be the control-a-head key 628 a prompt 630 "Show Code" is displayed. It will be noted that the pressing of the glass, mug, pitcher, cancel, repeat, or purge key is not recognized. The security routine is exited by pressing the off key.

After the prompt "Show Code" 630 is displayed a call 632 is made for the buttons subroutine and a decision 634 is made whether any key other than the purge key has been pressed. If No, an instruction 636 is issued to go to the main program (FIG. 6f); if Yes, the purge key has been pressed the buttons subroutine continues. But if Yes, and any other key has been pressed, a decision 638 (FIG. 6c, page 2) is made whether the key pressed is a first entry. If Yes, an instruction 640 is issued to clear the old code and enter the first entry for the new code and the code entry is displayed at 642. If No, the "Code Entry" prompt 642 is displayed and a decision 644 is made whether the six digits of a six digit code have been entered. If No, return 646 is made to the call buttons step 632 and the process repeated until the decision 644 is Yes. When Yes, an instruction 648 is issued to go to the purge program (FIG. 6k) for cleaning the tap; else the display is pressed to enter the programming program (FIG. 6d).

Security Programming

In the program mode (FIG. 6d), the programming program at start 650 begins with a decision 652 whether the volume has to be adjusted. If Yes, exit is made to the interrogation subroutine (FIG. 6h) for volume adjust. After volume adjust return is made to the programming program and to the next step 656 to display the prompt means connected to "Program Glass Time". But, if decision 652 is No, the prompt 656 "Program Glass Billing Time" is displayed.

To program the glass filling time, first an instruction 658 is issued to call up the buttons subroutine (FIG. 6b) for a decision 663 whether a key has been pressed and if so which key. If after testing each key the decision 660 is No, a code zero is issued and exit 662 is made to the main program. If decision 660 is Yes, a key has been pressed and the key is the glass key upon receipt of a code 1 an instruction 664 is issued to go start glass calibration subroutine beginning at step 684. If during the glass calibration the mug, pitcher, cancel, repeat, control-a-head, and purge keys are pressed, instructions 666–676 are issued to continue the call buttons subroutine 626 in lieu of code 2, 3, 4, 6, 7 and 8 to avoid interference with the glass calibration. However, if the dispense key has been pressed, a code 5 is transmitted and jump is made to an instruction 680 (FIG. 6d, page 2) issued to save the new calibration time and an instruction 681 issued to go to step 710 (FIG. 6d, page 3) hereinafter described. Also, if the on/off switch is pressed to turn off the system a code 8 is transmitted and an instruction 682 is issued to exit the glass fill calibration and to go to the off program (FIG. 6e).

Upon receipt of the code 1 at 664, to start the glass calibration an instruction 684 (FIG. 6d) is issued to set calibrate and valve bits. This is done using the real time clock to count the time it takes to pour a glass of beer; timing begins and ends with glass key presses. Thus, an instruction 685 is issued to set pour time to zero and an instruction 686 is issued to call buttons subroutine. A decision 688 is made whether a key has been closed. If No, (code 1) the calibrate bit is cleared and exit 690 made go go to the main program (FIG. 6f); if Yes, the glass key is pressed, the glass calibration is complete and an instruction 692 is issued to go to step 696 (FIG. 6d, page 2) hereinafter described.

If during glass calibration, the mug, pitcher, cancel, display, repeat, control-a-head, or purge keys are pressed call buttons subroutine 686 continues with the glass calibration, but, if the off key is pressed glass calibration is interrupted and an instruction 694 is issued to go to the Off program (FIG. 6e).

Returning to "End Glass Calibration" by pressing the glass key step 692, an instruction 696 (FIG.6d) is issued to clear the value bit and an instruction 698 is issued to call up the buttons subroutine for a decision 700 whether a key is closed. If No, a code zero 702 is issued to go to the main program (FIG. 6e); if Yes, an instruction 704 is issued to start calibration again and go back to the set calibrate and valve bit instruction 684 (FIG.6d). Again, if the mug, pitcher, cancel, repeat, or purge key is pressed during calibrate the call buttons subroutine 698 continues. However, if the display key is pressed the calibration is not saved and an instruction is issued to go to step 710 (FIG. 6d), and if the control-a-head key is pressed an instruction 680 is issued to save the new calibration time and the instruction 681 is issued to go to step 710 (FIG. 6d).

Step 710 is an instruction issued to display the current volume for a glass. A call 712 is issued for the buttons subroutine and a decision 714 is made whether a key is closed. If No, a code 0 716 is issued to go to the main program (FIG. 6f); if Yes, the cancel key 718 has been pressed an instruction 720 is issued to decrement the volume count and return to call buttons subroutine 712, or if the repeat key is pressed at 722 an instruction 724 is issued to increment glass volume and return to the call buttons subroutine 712. But, if the call-a-head key is pressed at 726 an instruction 728 is issued to save the glass volume calibration value and go the mug calibration program. If the glass, mug, pitcher, or purge keys are pressed the call buttons subroutine 712 continues, but if the off switch is turned to off, the off program (FIG. 6e) is called up.

The mug and pitcher calibration flow programs (CG 2500; FIG. 6d) are the same type as for glass flow calibration and therefore for brevity are not described. The principal difference being only the times it takes to fill the mug and pitcher.

Off Program

The off program (FIG. 6e) is called up at turn on to enter the system, and thereafter each time the on/off switch is moved from the on position to the off position. Thus, when the system is first turned on, the off program (FIG. 6e) at start issues instructions 730 and 732, respectively, to blank the display and to call up the buttons subroutine for a decision 734 to be made whether a key has been pressed. If Yes, any key pressed, except the purge key which calls up the main program, causes a return to the call buttons step 732; if No, a decision 738 is made whether a security code is required. If No, exit 740 is made to the main program; if Yes, instructions 742 and 744 are issued to display, respectively, a prompt "Enter Code" and to call up the buttons subroutine for a decision 746 whether a key has been pressed. If No, the buttons subroutine 744 continues; if Yes, the pressing of any key, except purge and the on/off keys which, respectively, call up the main or return to start of the off program, causes a decision 748 (FIG. 6e) to be made whether the first and succeeding digits of the code entry made by the pressed key is correct. If No, an instruction 750 is issued to clear and start over; if Yes, a decision 752 is made whether the entry of the code is complete. If No, return is made to decision 748; if Yes, exit is made to the main program (FIG. 6f).

Main Program

After entry and with the key switch set in the NORMAL position the main program (FIG. 6f) is started with instructions 754 and 756 issued, respectively, to display the prompt "Computap"and to call up the buttons program for a decision 758 whether a key has been pressed. If No, the buttons subroutine 756 continues to await the pressing of a key. If Yes, and it is the glass key the dispense a glass program (FIG. 6g) is called up. Similarly, if it is the mug or pitcher key pressed, the dispense a mug program or dispense a pitcher program is called up. After pressing the glass, mug, or pitcher dispensing program, the cancel key may be pressed to cancel their operation and return to the call buttons routine 756. To display the accounting information the display key is pressed to call up the interrogate program (FIG. 6h); at any time during the interrogate the repeat key is pressed to return to step 756. Thus, after getting the desired information the repeat key can be pressed to re-enter the main program key selection step 756.

Figure 6I:
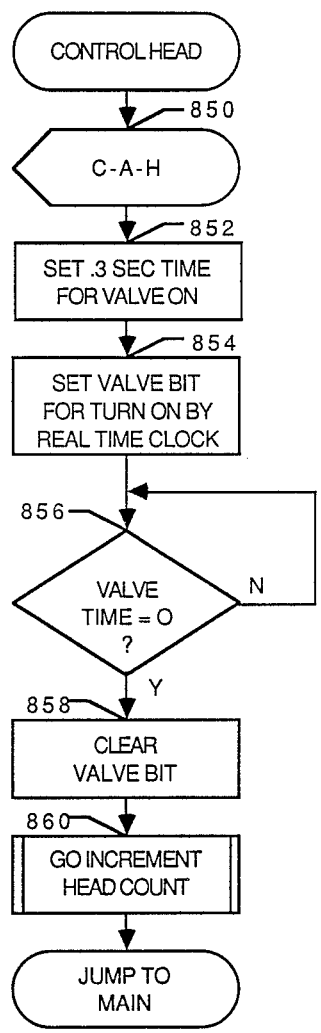
Figure 6J:
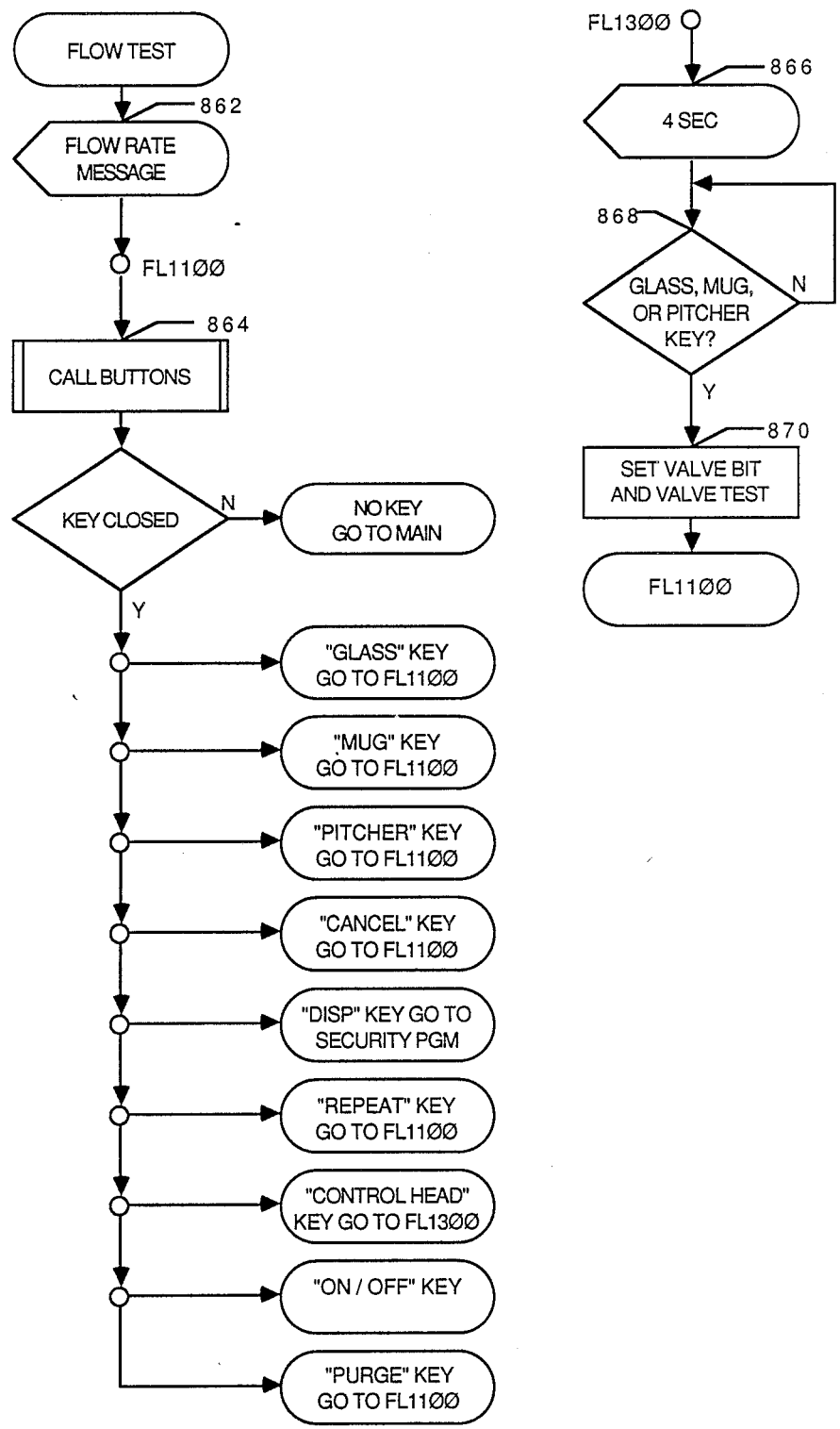

To put a head on a beer, the control-a-head key is pressed to call up the control-a-head program (FIG. 6i). To cut off power to the display/valve actuating solenoid the on/off key is pressed. If the Normal/Program switch is set to program, the purge program (FIG. 6k) as indicated by the means connected to display showing the prompt "Purge", is called up.

Glass, Mug, Pitcher Dispensing

After entry into the NORMAL mode, beverage dispensing (FIG. 6g) is in order. Referring now to FIG. 6g, the flow dispensing program at start begins with an instruction 760 to display the "GLASS" mug or pitcher as selected by pressing the glass, mug, or pitcher keys. If the glass, mug, or pitcher button is pressed, two instructions 762 and 764 are issued, respectively, to move calibrated glass, mug, or pitcher time to pour time counter and to set valve on bit. Then a decision 766 is made whether the pour is completed. If Yes, jump is made to step 782 (FIG. 6g) for the glass, mug, or pitcher count increment hereinafter described; if No, a call 768 is made for the buttons subroutine and a decision 770 is made whether a key has been pressed. If No, or if any one of the glass, mug, pitcher, display, control-a-head keys has been pressed return is made to decision 766. If the cancel key has been pressed, an instruction 772 is entered to turn the valve off, and calls 774 and 776 are issued, respectively, for subroutines to go increment cancel total and to go compute cancelled volume, and then return to the main program (FIG. 6f). If the on/off key has been pressed exit is made to the off program (FIG. 6e) and if the purge is desired the switch key is turned to program and exit is made to the purge program (FIG. 6k). If the repeat key has been pressed instructions 778 and 780 at (FIG. 6g) are issued to set the continuous pour flag and to display a "Continuous-Pour" prompt. Then jump is made to the step 782 previously mentioned above in connection with decision 766, and a call is issued for the increment glass count subroutine. Next, instructions 784 and 786 are issued, respectively, to move calibrated glass time to the pour time counter and to set the valve on bit. Then a decision 788 is made whether the pour is complete. If No, a call 790 is made for the call buttons subroutine and the decision 792 is made whether a key has been pressed. If no key has been pressed or if any one of the glass, mug, pitcher, display, control-a-head keys has been pressed return is made to the pour complete decision 788. If either the cancel or repeat keys are pressed exit is made to the main program. If the on/off key is pressed or if purge position selected exit is made to the off program or purge program, respectively. If decision 788 is Yes, then a decision 794 is made whether the continuous pour key has been pressed. If Yes, return is made to the go increment glass count step 782, else exit is made to the main program (FIG. 6f).

Returning to the four complete decision 776 (FIG. 6g), if Yes, then the call 782 (FIG. 6g) is made for the go increment glass subroutine and the steps following the call are made as described above.

It will be appreciated that the flow diagrams for mug and pitcher dispensing are substantially those for the dispense glass program of FIG. 6h, and therefore have been combined.

Interrogate Program

The interrogate program (FIG. 6h) operates in either the NORMAL or PURGE modes. Thus, the interrogate program (FIG. 6h) begins with a decision 796 whether the system is in the normal operation mode. If No, exit is made to the purge program (FIG. 6k); if Yes, a decision 798 is made whether the volume adjust has been enabled for the normal mode operation. If Yes, an instruction 800 is issued to display the "volume adjust 0 to plus or minus 2.5 to 12%" and a call 802 is made for the call buttons subroutine (FIG. 6b) for a decision 804 whetter any key has been pressed. If No, the buttons subroutine 802 continues until a key has been pressed. If Yes, and the key pressed is the glass, mug, or pitcher key jump is made, respectively, to the glass I1000 (FIG. 6h), mug I1100 (FIG. 6h), or pitcher I1500 (FIG. 6i) count hereinafter described. If the cancel key (FIG. 6h) is pressed an instruction 806 is issued to decrement the volume adjust count and return to button subroutine 802, or if the repeat key is pressed an instruction 808 is issued to increment the volume adjust and return to buttons subroutine step 802. If the display key is pressed return is made to purge if called from the purge mode else jump is made to display glass count step 810 (FIG. 6h). If the control-a-head key is pressed, the control-a-head program (FIG. 6i) is called up, or if the on/off switch is pressed the off program (FIG. 6e) is called up and if the switch is set to program the purge program (FIG. 6k) is called up.

The display glass count at I1000 (FIG. 6h) begins with a decision 810 whether the system is in the normal mode. If No, an instruction 812 is issued to display the total glass count and a call 814 is made for the buttons subroutine (FIG. 6b); else an instruction 816 is issued to display the total shift register glass count, and return to the buttons subroutine 814 for a decision 818 whether a key has been pressed. If No, step 814 is repeated until a key has been pressed. If Yes, the pressing of any of the glass key, mug key and pitcher keys calls up, respectively, the display glass, mug and pitcher counts for display. The cancel key, if pressed during the normal mode, calls up the main program (FIG. 6f) else back to purge (FIG. 6k). The display and repeat keys call up, respectively, the next steps in the interrogation, namely the display mug count (FIG. 6h) and the displaying pitcher count. The control-a-head key (FIG. 6h) in the NORMAL mode calls up the control-a-head count (FIG. 6h) else the buttons subroutine 818 continues. The on/off key if off calls up the off program (FIG. 6e). While, the purge key if true and the program called from the purge mode then the buttons subroutine 814 continues or if called from the normal mode then jump is made to the main program. But, if the purge key is false and the program called from the purge mode, exit is made to the main program or if the purge key is false and the program called from the NORMAL mode, the buttons subroutine 814 continues.

The next interrogate steps are the display mug count step subroutine 820 (FIG. 6h), the display pitcher count subroutine 822, the display cancel count step subroutine 824, the display cancel ounces subroutine 826, the display control-a-head count step subroutine 828, the display total volume ounces step subroutine 830, and the clear counter step subroutine 832 (FIG. 6h). As, except for the clear counter step, all the steps (steps 820–830)

include the same type flow diagram as for the glass count, thus these steps are not repeated. The flow diagram for the glass count begins at decision 810 of the display glass count subroutine at I1000 (FIG. 6h).

The clear counters step 832 (FIG. 6h) begins with a decision 834 whether the normal mode has been selected. If No, an instruction 836 is issued to display a prompt "Clear All Counters" and a decision 838 is made whether the control-a-head key has been pressed. If Yes, an instruction 840 is made to clear all counters and exit is made to the flow test program (FIG. 6j); if No, return is made back to purge control and a decision 842 is made whether the display key has been pressed, if No, return is made to decision 834, else exit is made to the main program (FIG. 6f).

If the previous decision 834 is Yes, a prompt 844 to "Clear Shift Counters" is displayed and a decision 846 is made whether the cancel key has been pressed. If No, jump is made to decision 842; if Yes, an instruction 848 is issued to clear shift counters and exit is made to the main program.

Control-A-Head

Referring now to FIG. 6i, the control-a-head subroutine begins with an instruction 850 to display "CAH" which is followed by instructions 852 and 854, respectively, to set a 0.3 second time for the valve to be on and to set valve bit for turn on by real time clock. Then a decision 856 is made whether the valve time is equal to zero. If No, the decision 856 is repeated; if Yes, instructions 858 and 860 are issued to clear the valve bit and go increment the head count and exit is made to the main program.

Flow Test

The flow test (FIG;. 6j) which was referred to in the clear counters routine (FIG. 6h), begins with a prompt 862 to display "Flow Rate Message" and a call 864 for the buttons subroutine (FIG. 2b). If it is determined the control-a-head key has been pressed a "4 SECOND" prompt 866 is displayed and a decision 868 is made whether the glass, mug, or pitcher key has been pressed. If No, the decision is repeated, if Yes, an instruction 870 is issued to set valve bit and valve test and return is made to the buttons subroutine 864. The flow test is actually a carry over from the first embodiment and retention is optional.

PURGE

Referring now to FIG. 6k, the purge program is primarily to provide for cleaning the system without incrementing the dispensing counts. When the purge mode is selected by turning the key switch to the program position an instruction 900 is issued to display "PURGE" and to issue a call 902 for the call buttons subroutine (FIG. 6b) for a decision 904 as to whether a key has been pressed. If No, exit is made to the main program (FIG. 6f); if Yes, a key has been pressed, and if it is the glass, mug, or pitcher key, the glass, mug, or pitcher subroutines 906 (FIG. 6k), 908 (FIG. 6k). and 910 (FIG. 6k) are called up; or if it is the cancel, purge, or repeat keys (FIG. 6k), the buttons subroutine 902 is continued. If the display or control-a-head or on/off key is pressed, respectively, exit is made to the program mode (FIG. 6d); or to the control-a-head subroutine (FIG. 6i); or to the off program (FIG. 6e).

As the purge a glass, mug, or pitcher subroutines are of the same type only the glass program will be described. With selection of the glass key 906 (FIG. 6k) an instruction 912 is issued to display the prompt "Glass" and instruction 914 is issued, to move programmed glass time to pour time and set valve on bit. Then a call 916 for the buttons subroutine is made to determine by decision 918 whether any key has been pressed. If No, exit is made to the main program; if Yes, and it is the glass, mug, pitcher, display or control-a-head key that was pressed, the call buttons subroutine 916 is continued. If the cancel key was pressed, the valve bit is cleared and return is made to purge 900; of if the repeat key was pressed, the continuous pour mode is set. But if the purge key was pressed, a decision 920 (FIG. 6k) is made whether the on time for the valve has run out. If No, return is made to the call buttons 916 subroutine (FIG. 6k); if Yes, an instruction 922 is issued to clear the valve bit and return to purge 900 (FIG. 6k).

Although only a single embodiment of the invention has been disclosed, it will be apparent to a person skilled in the art that various modifications to the details of construction shown and described may be made without departing from the scope of this invention.

What is claimed is:

1. A computerized dispensing system comprising:
    a sensor fitting means for passing the flow of pressurized beverage from a source thereof, said sensor fitting means including a velocity measuring means for measuring the velocity of the flowing beverage for producing signals indicative of changes in the velocity of the flowing fluid;
    a tap means connected to the sensor fitting means for dispensing the beverage flowing from the sensor fitting means, said tap means including an electrically operated valve means for controlling the flow of the beverage from the tap means;
    wherein the sensor fitting means includes first and second flared ends, said first and second flared ends for connection to a source of beverage and to the tap means, respectively, a constricted passage between the first and second flared ends, a transducer means mounted between said first and second flared ends, a passage connecting the transducer means to the second flared end, and the velocity measuring means mounted in the passage for communication with the passage and the constricted passage for measuring the velocity of beverage flowing through the constricted passage and communicating velocity indicating signals to the transducer means for generating electrical signals indicative of the measured velocity; and
    a computerized controller including means responsive to the changes in velocity indicating signals of the sensor fitting means for determining substantially continuously the time required for dispensing a substantially exact quantity of the beverage, and means for generating valve means actuating signals during the valve on time, said electrically operated valve means responsive to the valve means actuating signals for dispensing the substantially exact quantity of the beverage.

2. A computerized dispensing system according to claim 1 wherein the transducer means includes a pressure transducer, and the velocity measuring means is a Pivot tube having a first end positioned in the constricted passage for producing pressure signals indicative of the velocity of the beverage flowing through the fitting sensor and a second end connected to the passage for communicating the velocity measuring pressure signals to the pressure transducer for producing electrical signals representative thereof.

3. A computerized dispensing system comprising:

a tap means connected to a beverage source for dispensing the beverage, said tap means including an electrically operated valve means for controlling the beverage flow from the tap means;

a computerized controller connected to the electrically operated valve means, a front panel including a keypad having a beverage volume selection means and a volume adjust means connected to the computerized controller, said computerized controller responsive first, to actuation of the volume selection means first to turn on the electrical valve to start a flow of the beverage and to begin counting the flow time and secondly to stop the flow of the beverage after dispensing a preselected beverage volume and to determine the flow time therefor, and secondly, to dispense said volume thereafter responsive to actuation of the volume selection means, and to the volume adjust means for thereafter incrementally adjusting the flow time up or down as required to maintain substantially the selected volume of dispensed beverage; and wherein the computerized controller further includes a first means connected to the means for controlling operation of the electrical valve means for determining the number of preselected volumes dispensed and second means connected to the first means for determining the total number of beverage ounces dispensed; and further including a purge selection means connected to the computerized controller and the computerized controller includes means connected to the first and second means for disabling the first and second means during operation of the electrical valve means during purging whereby during purging the tap means is cleaned with the beverage or a cleaning fluid without incrementing the number of volumes and ounces dispensed.

4. A computerized dispensing system according to claim 3 wherein the keypad includes a plurality of keys and the computerized controller includes means connected to the keypad keys for entering an access reference code, and means connected to the keypad keys for thereafter receiving a code for comparison with the access reference code for accessing the computerized controller.

5. A computerized dispensing system according to claim 3 wherein the tap means includes pressure and temperature transducer means connected to the computerized controller for measuring the pressure and temperature of the beverage flowing through the tap means, and the computerized controller includes means connected to the pressure and temperature transducer means for receiving pressure and temperature indicating signals and a means connected to the means for receiving the pressure and temperature indicating signals for indicating abnormal pressures and temperatures.

6. A computerized dispensing system according to claim 5 wherein the computerized controller further includes means connected to the means for indicating abnormal pressures and temperatures for preventing operation of the electrical valve means of the tap means during abnormal pressures and temperatures.

7. A computerized dispensing system according to claim 5 wherein the front panel further includes a display means connected to the computerized controller and the computerized controller includes means for displaying the pressures and temperatures of the beverage and for indicating selectively turn off resulting from abnormal pressures and temperatures.

8. A computerized dispensing system according to claim 3 wherein the computerized controller includes means connected to the first and second means and to a display means for displaying the number of volumes dispensed together with the number of ounces dispensed.

9. A computerized dispensing system according to claim 3 wherein the volume selection means of the keypad includes a glass, mug, and pitcher selection means and the computerized controller includes means connected to the glass, mug, and pitcher selection means for timing the times for filling the glass, mug, and pitcher and means connected to the means for timing the times for filling the glass, mug, and pitcher and to the electrical valve control means of the tap means for opening the electrical valve means selectively for dispensing glass, mug, and pitcher, volumes.

10. A computerized dispensing system according to claim 9 wherein the keypad further includes repeat and cancel keys and the computerized controller includes first and second means connected to the repeat and cancel keys and to the electrical valve means control means for continuously pouring a glass, mug, pitcher, or control-a-head volume and for cancelling selectively the glass, mug, and pitcher, and the continuous pour thereof.

11. A computerized dispensing system according to claim 9 wherein the keypad further includes a display key and the computerized controller includes means containing operation programs and interrogating means connected to the means containing operating programs and display means for interrogating the programs and displaying prompts for programming the computerized controller or for selecting information therefrom.

12. A computerized dispensing system comprising:

a tap means connected to a beverage source for dispensing the beverage, said tap means including an electrically operated valve means for controlling the beverage flow from the tap means;

a computerized controller connected to the electrically operated valve means, a front panel including a keypad having a beverage volume selection means and a volume adjust means connected to the computerized controller, said computerized controller responsive first, to actuation of the volume selection means first to turn on the electrical valve to start a flow of the beverage and to begin counting the flow time and secondly to stop the flow of the beverage after dispensing a preselected beverage volume and to determine the flow time therefor, and secondly, to dispense said volume thereafter responsive to actuation of the volume selection means, and to the volume adjust means for thereafter incrementally adjusting the flow time up or down as required to maintain substantially the selected volume of dispensed beverage; and wherein the front panel further includes an on/off switch and a key switch including normal and program positions and the computerized controller means includes first, second, and third means connected, respectively, to the on/off switch, and normal and program positions of the key switch for initializing the computerized controller and selecting the normal and surge operating modes, respectively, for the computerized controller whereby upon initialization with the key switch set to normal the normal mode is ready and can be changed to the purge mode only when the program position is selected using a key for the key switch.

13. A computerized dispensing system according to claim 12 wherein the programmer controller further includes a fourth means for programming the computerized controller and wherein the third means for the purge operation and the fourth means for programming are sequentially entered when the key switch is in the program position.

14. A computerized dispensing system comprising:
a source of beverage for dispensive;
a tap means for dispensing the beverage;
a sensor fitting means having a passage for connecting the beverage source to the tap means, a tubular means having a first end in operative association with the passage for substantially continuously converting the velocity of the beverage flowing in the passage to pressures indicative thereof, and a transducer means connected to a second end of the tubular means for generating signals indicative of the pressures; and
a controller means including a first means connected to the sensor fitting means for receiving the pressure indicating signals, a second means connected to the first means for determining the time for dispensing a preselected volume of the beverage using the pressure indicating signals, and a third means connected to the tap means for operating the tap means a time sufficient for dispensing substantially the preselected beverage volume.

15. A computerized dispensing system comprising:
a sensor fitting means for passing the flow of pressurized beverage from a source thereof, said sensor fitting means responsive to pressure of the flowing beverage and atmospheric pressure for producing difference pressure signals indicative of changes in the flowing fluid pressure and including first and second flared ends, a constricted passage between said first and second ends, a pressure transducer mounted between said first and second flared ends, and a passage connecting the first flared end to the pressure transducer, said transducer being in communication with the atmospheric pressure and passage to the first flared end for generating the difference pressure indicating signals, and a temperature sensor mounted between the first and second flared ends of the sensor fitting means for measuring the temperature of the beverage flowing through the sensor fitting, and said computerized controller responsive to the output of the temperature sensor for controlling the on/off operation of the dispensing system;
a tap means connected to the sensor fitting means for dispensing the beverage flowing from the sensor fitting means, said tap means including an electrically operated valve means for controlling the flow of the beverage from the tap means, a nozzle connected to the valve means, and a cooling means attached to the nozzle; and
a computerized controller including means responsive to the difference pressure signals of the sensor fitting means for determining substantially continuously the time required for dispensing a substantially exact quantity of the beverage, and means for generating valve means actuating signals during the valve on time said electrically operated valve means responsive to the valve actuating signals for dispensing the substantially exact quantity of the beverage, and means connected to the cooling means, said cooling means responsive to computerized controller signals for cooling the nozzle whereby the generation of foam until the nozzle reaches the temperature of the beverage is substantially reduced by the cooling of the nozzle by the cooling means.

16. A computerized dispensing system according to claim 15 wherein the cooling means is a thermoelectric heat pump.

17. A computerized dispensing system comprising:
a difference pressure and temperature sensor fitting means including a difference of pressure sensor for producing difference pressure signals indicative of changes in the flowing fluid pressure and a temperature sensor for producing temperature signals indicative of changes in temperature of the flowing fluid in the fitting means;
a tap means connected to the difference pressure and temperature sensor fitting means for dispensing the fluid flowing from the sensor fitting means, said tap means including an electrically operated valve means for controlling the flow of fluid from the tap means; and
a programmable controller means including a central processing unit including means connected to the difference pressure and temperature sensor fitting means for receiving the difference pressure and temperature indicating signals and generating signals indicative of abnormal pressures or temperatures or both, and means responsive to the abnormal pressure or temperature of both signals for cutting off operation of the electrically operated valve means; a plurality of power connector circuits connected to the central processing unit for controlling normal operation modes of the computerized dispensing system including an override circuit connected to the central processing unit, said central processing unit being responsive to power from the override circuit for inactivating the means for switching off the electrically operated valve means for a pressure failure and switching back on the electrically operated valve; and a display means connected to the central processing unit for displaying selected operational modes.

18. A computerized dispensing system according to claim 17 wherein the central processing unit includes means for receiving a plurality of messages for display, and means for displaying the messages sequentially for preselected periods during the time operational information messages are not being displayed.

19. A computerized dispensing system according to claim 17 wherein the display means includes a front and a back display means for displaying front and back operating messages during active operation times of the system and preselected messages during standby operation times.

* * * * *